United States Patent
Schlipf et al.

(10) Patent No.: US 10,737,763 B2
(45) Date of Patent: Aug. 11, 2020

(54) SLAT TRACK DEVICE FOR AN AIRCRAFT WING

(71) Applicant: Airbus Operations GmbH, Hamburg (DE)

(72) Inventors: Bernhard Schlipf, Hamburg (DE); Stefan Bensmann, Hamburg (DE); Lutz Wiese, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 327 days.

(21) Appl. No.: 15/705,682

(22) Filed: Sep. 15, 2017

(65) Prior Publication Data

US 2018/0086432 A1    Mar. 29, 2018

(30) Foreign Application Priority Data

Sep. 23, 2016  (EP) .................................... 16190503

(51) Int. Cl.
*B64C 9/02*       (2006.01)
*B64C 13/28*    (2006.01)
(Continued)

(52) U.S. Cl.
CPC .................. *B64C 9/02* (2013.01); *B64C 3/50* (2013.01); *B64C 9/22* (2013.01); *B64C 9/24* (2013.01);
(Continued)

(58) Field of Classification Search
CPC .. B64C 9/02; B64C 13/28; B64C 9/22; B64C 3/50; B64C 13/341; B64C 9/24; B64C 9/14; F16H 19/08
See application file for complete search history.

(56) References Cited

U.S. PATENT DOCUMENTS

| 4,471,928 A | 9/1984 | Cole |
| 5,544,847 A * | 8/1996 | Bliesner ................... B64C 9/24 244/214 |

(Continued)

FOREIGN PATENT DOCUMENTS

| CN | 102574574 | 7/2012 |
| CN | 102834315 | 12/2012 |

(Continued)

OTHER PUBLICATIONS

Extended Search Report for EP16190503.9 dated Feb. 22, 2017, 9 pages.

(Continued)

*Primary Examiner* — Assres H Woldemaryam
(74) *Attorney, Agent, or Firm* — Nixon & Vanderhye P.C.

(57) ABSTRACT

A slat track device (7) for an aircraft wing (1) including a beam-shaped main load bearing track structure (9) connected to a slat (5) and movably connected to a main wing (3), a guidance surface (11) at the track structure (9) and guided along a corresponding guidance device (19) at the main wing, a connection device (13) at the track structure (9) connecting the track structure (9) to the slat (5), and an engagement device (15) at the track structure (9) and configured to engage a drive member (33) of a drive unit (37) provided at a main wing (3). The slat track device has redundant main load paths achieved by the track structure (9) having a first track member (41) and a separate second track member (43) both connected to the connection device (13) and the engagement device (15).

15 Claims, 18 Drawing Sheets

(51) Int. Cl.
*B64C 3/50* (2006.01)
*B64C 9/22* (2006.01)
*B64C 9/24* (2006.01)
*F16H 19/08* (2006.01)

(52) U.S. Cl.
CPC ............ *B64C 13/28* (2013.01); *B64C 13/341* (2018.01); *F16H 19/08* (2013.01)

(56) References Cited

U.S. PATENT DOCUMENTS

| | | | |
|---|---|---|---|
| 2011/0253832 A1* | 10/2011 | Wildman | B64C 9/02 244/99.13 |
| 2014/0061381 A1* | 3/2014 | Gyuricsko | B64C 9/22 244/99.3 |
| 2014/0339358 A1* | 11/2014 | Swartley | H01R 41/00 244/99.3 |
| 2015/0076283 A1 | 3/2015 | Schievelbusch et al. | |
| 2015/0083867 A1 | 3/2015 | Moser et al. | |
| 2015/0298795 A1* | 10/2015 | Parker | B64C 9/02 244/214 |
| 2018/0141637 A1* | 5/2018 | Schlipf | B64C 9/22 |

FOREIGN PATENT DOCUMENTS

| | | |
|---|---|---|
| CN | 103863554 | 6/2014 |
| CN | 104426113 | 3/2015 |
| CN | 105438448 | 3/2016 |
| EP | 0 045 988 | 2/1982 |
| EP | 0 291 328 | 11/1988 |

OTHER PUBLICATIONS

Chinese Office Action cited in Application No. 201710602631.4 dated May 6, 2020, 5 pages.

* cited by examiner

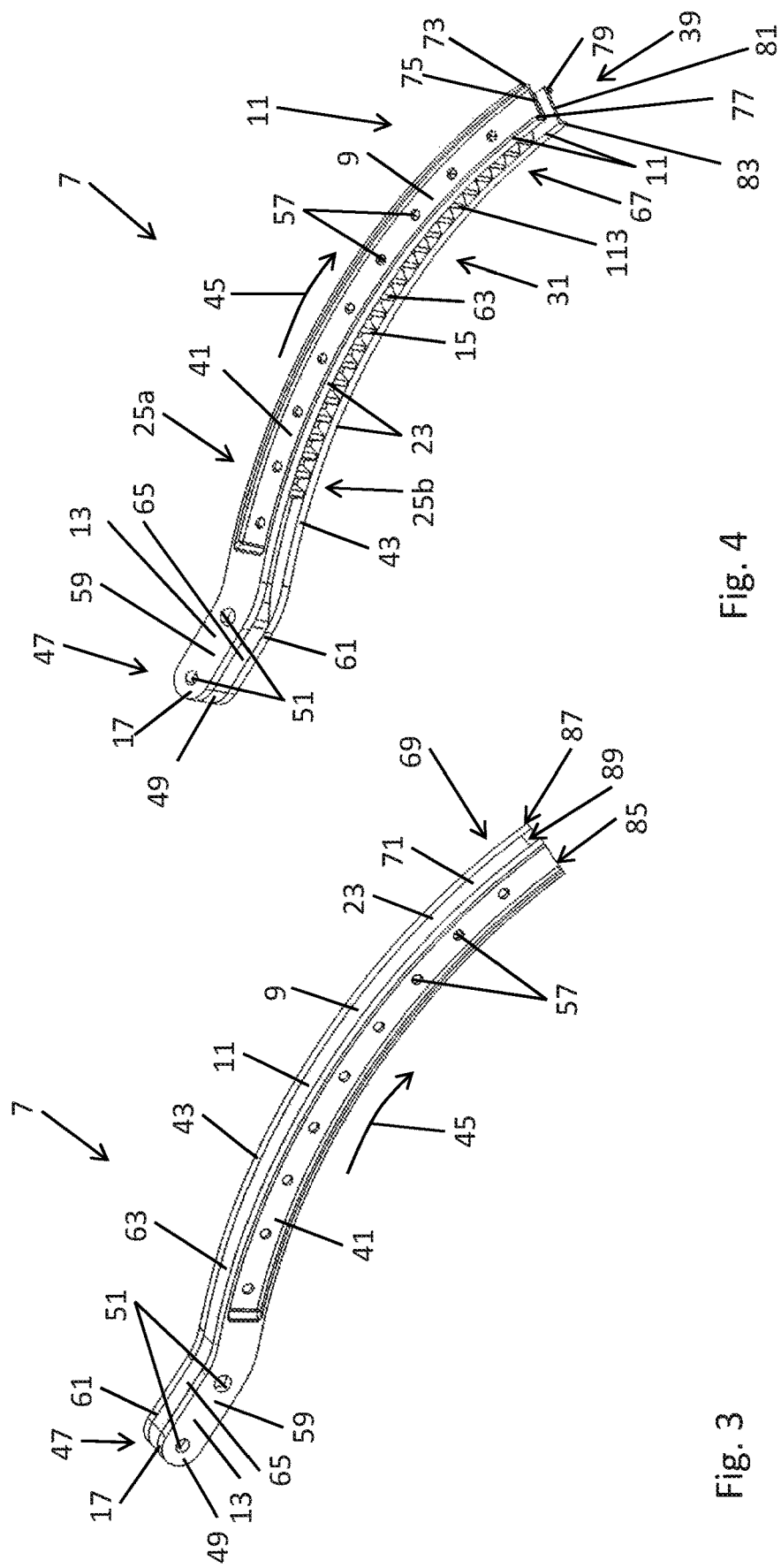

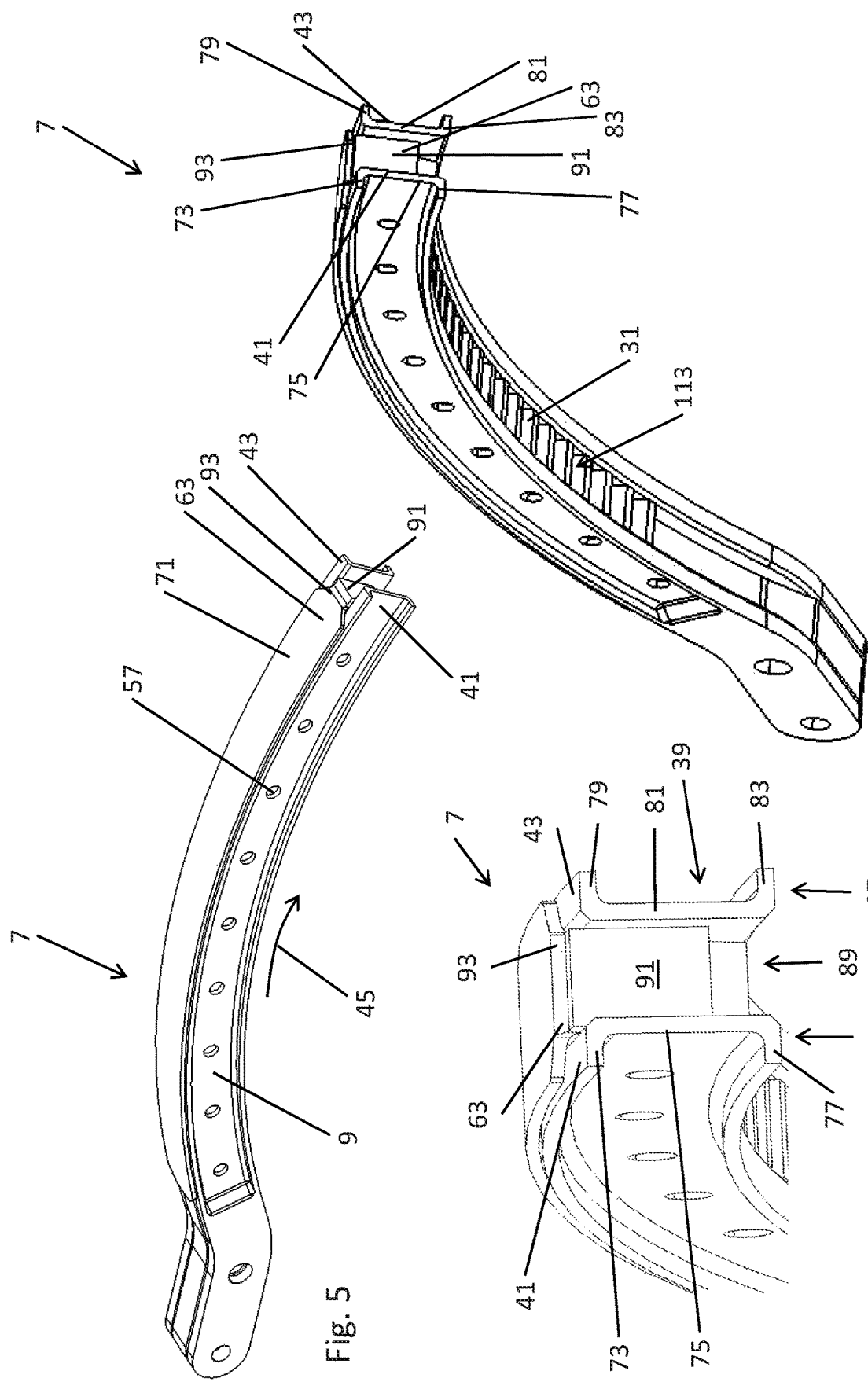

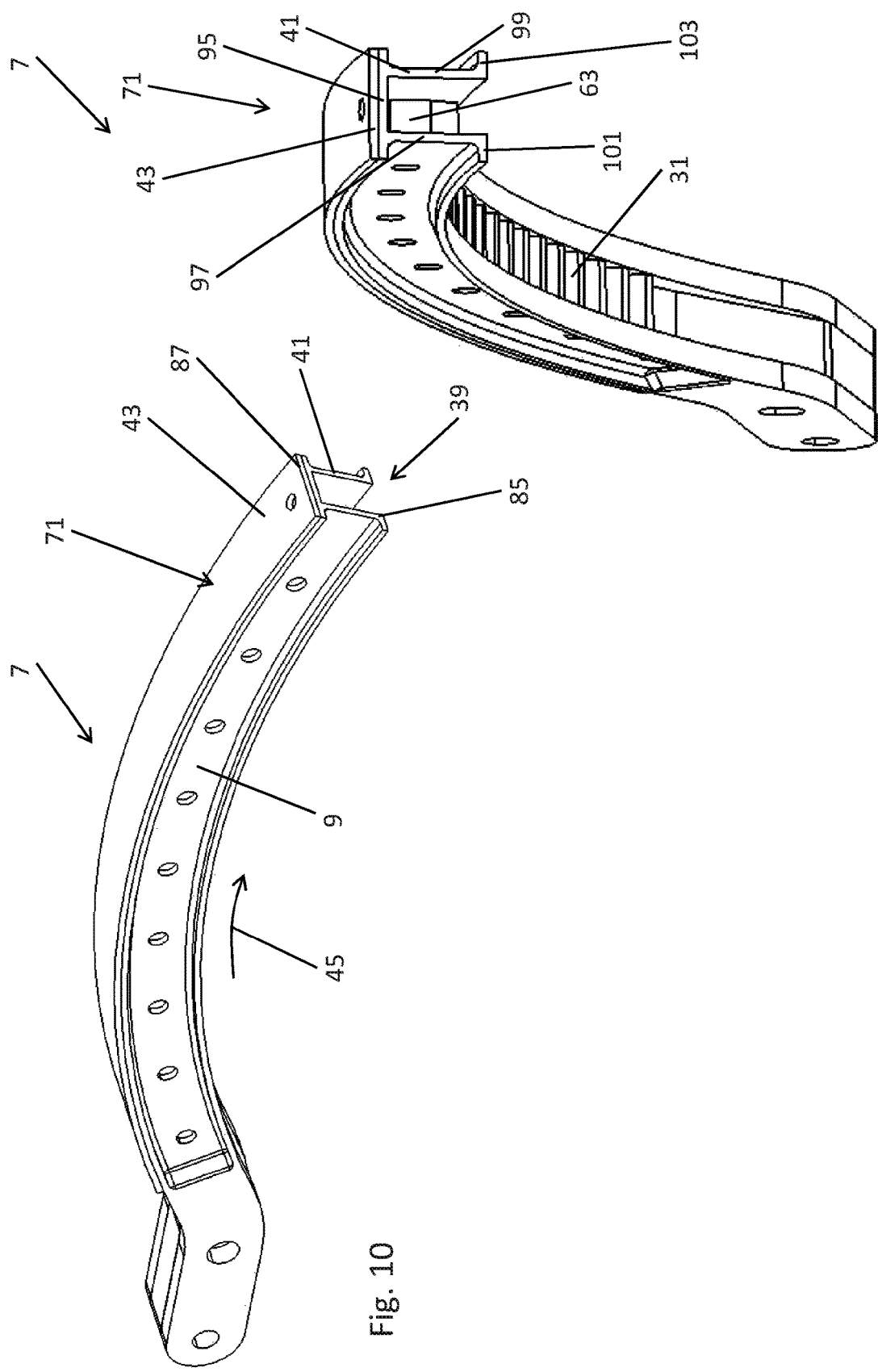

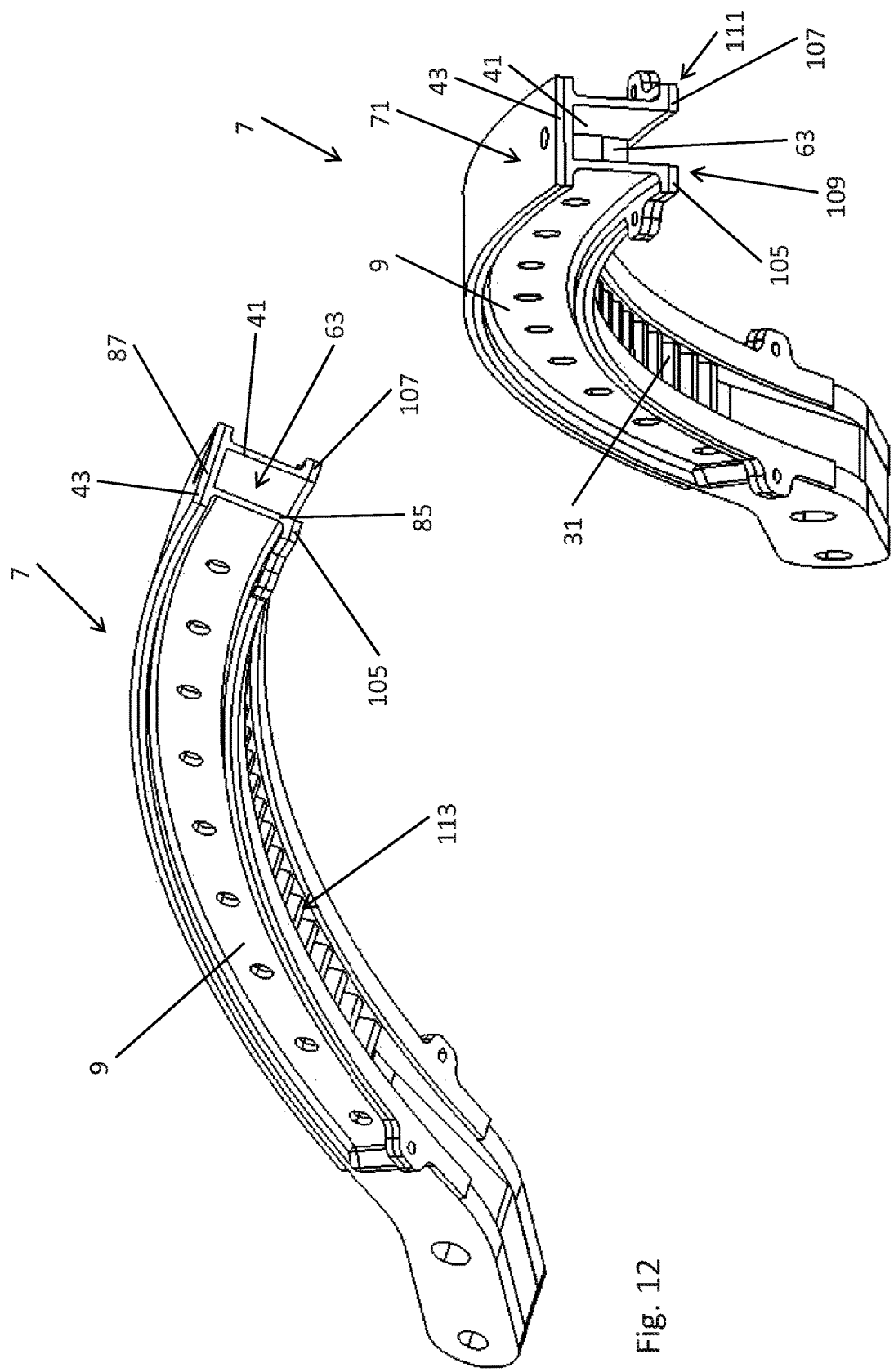

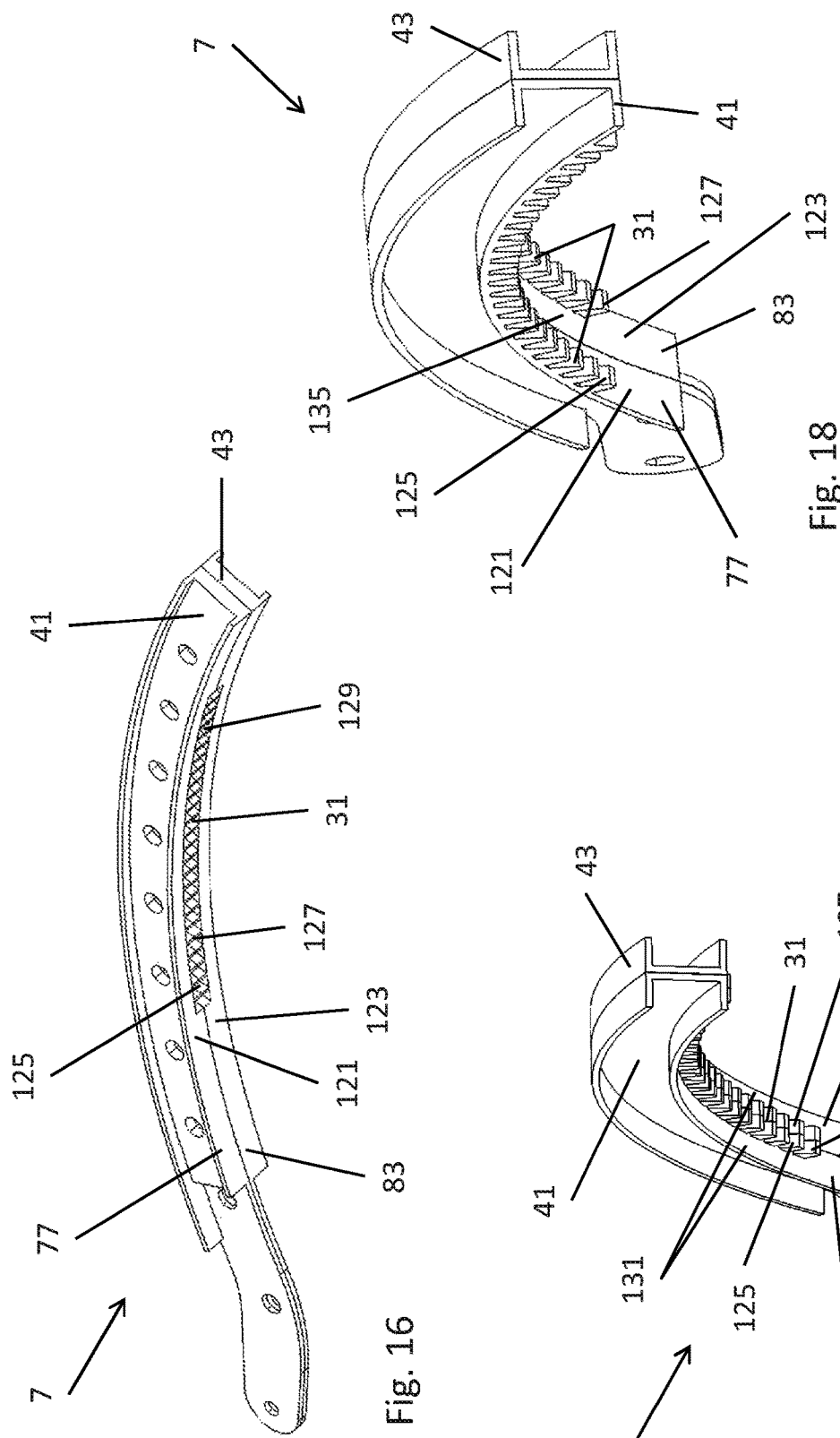

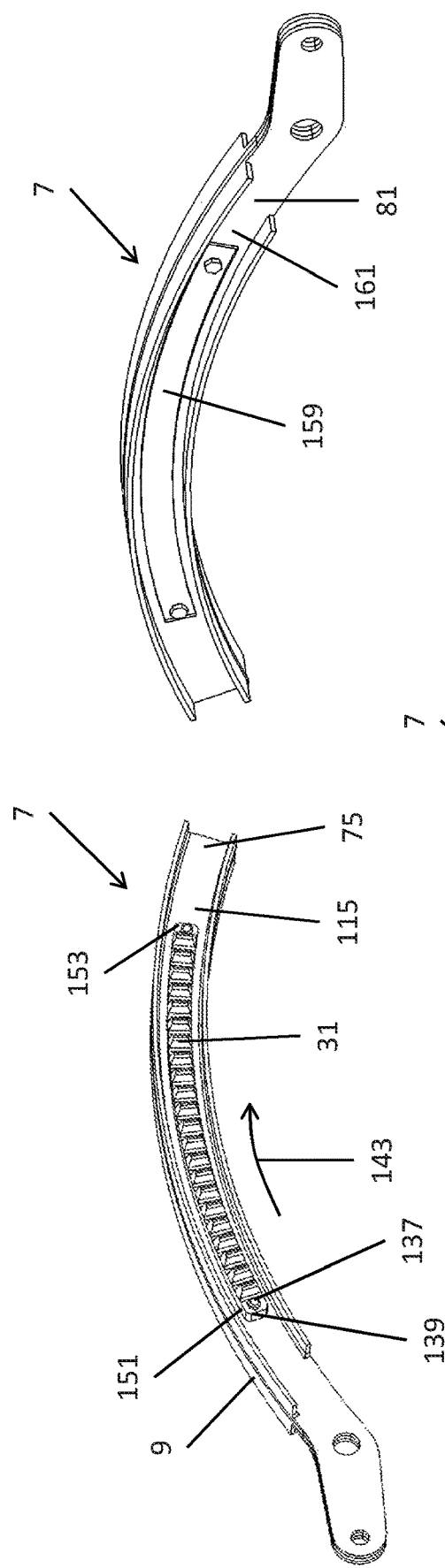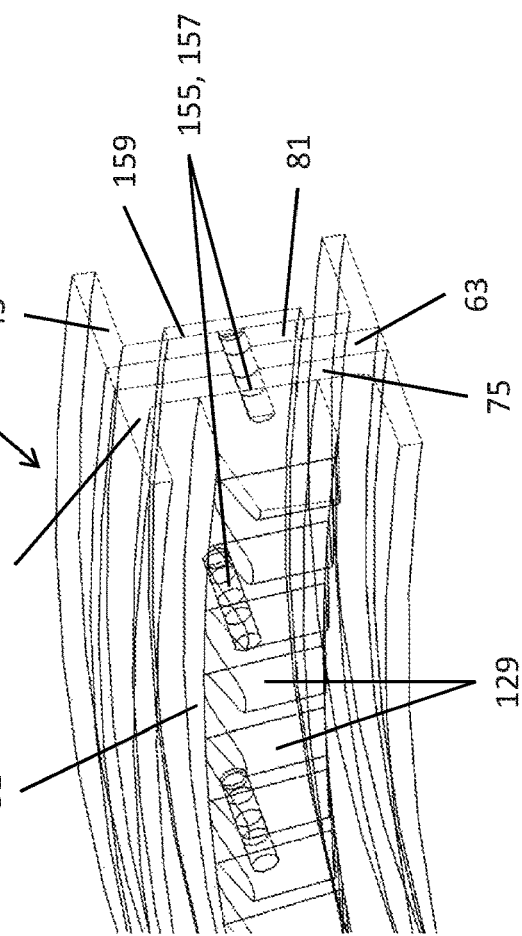

SLAT TRACK DEVICE FOR AN AIRCRAFT WING

RELATED APPLICATION

This application claims priority to European patent application Ser. No. 16190503.9 field Sep. 23, 2016, the entirety of which is incorporated by reference.

BACKGROUND OF THE INVENTION

The present invention relates to a slat track device for an aircraft wing, as well as to an aircraft wing comprising such a slat track device. Such an aircraft wing comprises a main wing and a slat, wherein the slat is movably connected to the main wing via the slat track device.

The slat track device comprises a beam-shaped main load bearing track structure, a guidance surface, a connection device and an engagement device.

The track structure is formed as an elongate support member which extends not necessarily strait but rather bent in the shape of a curved path along which the slat is moved with respect to the main wing when the slat is extended or retracted. The cross section of the track structure can have different shapes, such as a H-shape, which is commonly used in the Prior Art. The track structure is configured to be connected, such as fixedly connected, to a slat, such as at the first end of the track structure. The track structure is further configured to be movably connected to a main wing, such as for example that a translatory movement of the track structure along its longitudinal direction relative to the main wing is permitted.

The guidance surface is provided at the track structure, such as fixedly connected to or integrally formed with the track structure, and has an elongate shape extending along the longitudinal direction of the track structure.

The guidance surface is configured for being guided along a corresponding guidance device provided at a main wing. Such a guidance device may include rollers or slight surfaces, forming a guidance path. The guidance surface may include several surface portions provided on opposite sides of the track structure, so that movement of the track structure with respect to the corresponding guidance device is allowed only along the guidance path along the longitudinal direction of the track structure.

The connection device is provided at the track structure, such as a fixedly connected to or integrally formed with the track structure, such as at the first end of the track structure. The connection device is configured for connecting the track structure to a slat, such as in a fixed manner, e.g. with two hinges, one master and one slave.

The engagement device is provided at the track structure, such as connected to or integrally formed with the track structure. The engagement device is configured for engagement with a drive member of a drive unit provided at a main wing for moving the slat.

Such slat track devices are commonly known in the art and used in several aircraft models. Until recently, the fail-safe requirements of the aeronautical authorities, specifically of the US authority FAA (Federal Aviation Administration), specified that it had to be proven that a crack existing in the track structure of such a slat track device detected for the first time in a first routine check, does not propagate through the entire track structure until the next routine check. This means, it needs to be proven that the crack propagation through the entire track structure takes at least the time of an interval between two routine checks. In such a way it is guaranteed that a crack propagating in the track structure is detected at least in one routine check.

However, the FAA recently modified or clarified these fail-safe requirements for the slat track device. The track structure is now required to include two separate main load paths, wherein when one main load path fails, the other main load path is required to still be capable of maintaining the connection between the slat and the main wing during flight.

SUMMARY OF THE INVENTION

An invention has been conceived and is disclosed herein to provide a slat track device comprising redundant main load paths, i.e. at least one backup main load path in addition to a first main load path.

A embodiment of the invention includes a track structure having a first track member and a second track member. The first track member and the second track member are formed separately from one another. Each of the first track member and the second track member is connected to both the connection device and the engagement device, so that each of the first track member and the second track member forms an individual main load path.

In particular, the first track member and the second track member are fixedly, i.e. rigidly, connected to both the connection device and the engagement device, wherein the first and second track members can either be formed integrally with the connection device and/or with the engagement device, or be connected to the connection device and/or the engagement device, wherein the connection does not necessarily need to be a direct connection but can also be a connection through the respective other one of the first track member and the second track member, as long as the main load paths are not interrupted. The connection device may comprise a first device part that is rigidly connected to or formed integrally with the first track member, and the connection device comprises a second device part which is rigidly connected or formed integrally with the second track member.

In such a way, the track structure is split up in two separate track members, the first track member and the second track member, which form two individual main load paths, so that redundancy of the load path is achieved. That means, when one of the load paths, i.e. one of the first and second track members, fails, the other load path, i.e. the other one of the first and second track members, is still capable of holding the slat to the main wing. By such a design of the slat track device the updated FAA requirements should be met.

According to an embodiment of the invention, the first track member is formed and arranged symmetrically to the second track member with respect to a symmetry plane, in particular a vertical symmetry plane. Such a symmetric design of the first and second track members effects an advantageous load distribution and thus allows for a minimum weight.

According to a further embodiment, the first track member is connected to the second track member along the longitudinal direction of the track structure, such as via bolts. In such a way, although the first and second track members form individual load paths, the first and second track members are held together, thereby supporting one another and transferring loads collectively.

According to yet a further embodiment the engagement device is formed as a toothed rack configured to engage with a drive member in the form of a drive pinion of a drive unit provided at the main wing. By such a toothed rack engaging with a pinion, a very effective and reliable drive mechanism for driving the slat track device and, thus, the slat is obtained.

According to an alternative embodiment, the engagement device is formed as a hinged mounting for a hinge connection to a drive member in the form of a drive rod or drive strut of a drive unit provided at the main wing. The hinged mounting may be formed as a lug, such as a male lug. The drive rod may be connected to a linear motor, such as an electromagnetic, hydraulic or mechanic linear motor, or to a rotary drive, for example an electric rotary drive, of the drive unit. By such a hinge connection to a drive rod a very effective and reliable alternative way of driving the slat track device is provided.

In an embodiment, the connection device is formed as a lug, such as a male lug, that is configured for a hinge connection with a corresponding part, such as a female lug, of the slat. The male lug may be formed by a flat projection having a bore, and the female lug is may be formed by two flat projections having bores, wherein between the two projections a gap is provided for receiving the flat projection of the male lug, such that the bore of the male lug is aligned with the bores of the female lug. The male lug may comprise the first device part and the second device part resting against one another in a flat surface to surface manner. In such a way, the two separate load paths of the first and second track members can be joined at the connection device, or the first device part and the second device part, although forming separate load paths, can support one another by resting against one another when forming the male lug.

In a further embodiment, the track structure comprises a third track member. The third track member may be formed separately from the first track member and the second track member. The third track member is may be connected fixedly or rigidly to both the connection device and the engagement device, so that the third track member forms an individual main load path. The third track member can be formed integrally with the connection device and the engagement device but can also be connected to the connection device and the engagement device directly or indirectly via the first or second track member. Further, the connection device may have a third device part rigidly connected to the third track member and may rest against the first device part and/or the second device part. By the third track member, a further individual main load path is integrated in the track structure, so that the fail-safe reliability of the track structure is further increased.

In particular, the first track member and/or the second track member may be connected to the third track member along its longitudinal direction, such as via bolts. Further, the first track member and the second track member may be connected to one another via the third track member, i.e., the third track member is sandwiched between the first and second track members. In such a way, the first track member, the second track member, and the third track member support each other along the longitudinal direction and transfer loads collectively, although forming three individual load paths.

Specifically, the third track member may comprise the engagement device, which includes the toothed rack. In such a way the third track member with the engagement device is held between the first and second track member which allows for a symmetric design and a very effective load transfer, since the engagement device, e.g. the toothed rack, transfers the loads equally to both sides to the first and second track members.

According to an embodiment, the first track member, when viewed in a cross section perpendicular to the longitudinal extension, comprises a first upper flange portion, a first web portion and a first lower flange portion. Further, the second track member, when viewed in a cross section perpendicular to the longitudinal extension, may comprise a second upper flange portion, a second web portion and a second lower flange portion. The first and second web portions may extend vertically and the first and second upper and lower flange portions extend horizontally, when the track structure is in a normal orientation. Such a cross section of the first track member and the second track member provides a lightweight construction, where loads can be transferred effectively.

In particular, the first track member may have a C-shaped cross section formed by the first web portion connecting the first upper flange portion and the first lower flange portion at their opposite ends. The second track member may have a C-shaped cross section formed by the second web portion connecting the second upper flange portion and the second lower flange portion at their opposite ends. Further, the first web portion may extend opposite the second web portion. Specifically, the first web portion and the second web portion may abut one another, and be directly mounted to one another. In such a way, a double C-shaped cross section of the track structure is formed which represents a very simple and effective profile. By the first and second upper flange portions an upper surface portion of the guidance surface is formed which can easily be engaged by a corresponding guidance device, such as a roller provided at the main wing.

Alternatively, the third track member may be sandwiched between the first web portion and the second web portion, where the third track member may be connected to the first and second web portions via bolts. Further, the third track member may have a square cross section and be aligned with the first and second upper flange portions in order to together provide an upper surface portion of the guidance surface that can easily be engaged by a guidance device, such as a roller provided at the main wing. In such a way a very simple and strong profile of the track structure is formed, wherein the third track member can be reliably connected to the first and second track members although all three track members form individual load paths.

According to an alternative embodiment, the third track member has a T-shaped cross section. A first cross-sectional portion of the third track member may be sandwiched between the first and second web portions. A second cross-sectional portion of the third track member may rest against the first and second upper flange portions, such as above the first and second upper flange portions, in order to provide an upper surface portion of the guidance surface. By such a T-shaped cross section of the third track member the third track member can be sandwiched between the first and second track members, while at the same time the third track member provides an upper surface portion of the guidance surface, which is continuous and even, and which does not need to be aligned, as it is the case when the upper surface portion of the guidance surface is provided by the third track member together with the first and second track members.

As an alternative to the T-shaped cross section of the third track member, the third track member may have an I-shaped cross section or an H-shaped cross section, comprising a first cross-sectional portion, a second cross-sectional portion and a third cross-sectional portion. The first cross-sectional portion of the third track member is sandwiched between the first web portion and the second web portion. The second cross-sectional portion of the third track member rests against the first and second upper flange portions, i.e. lies above the first and second upper flange portions, thereby providing the upper surface portion of the guidance surface. The third cross-sectional portion of the third track member rests against the first and second lower flange portions, i.e. lies below the first and second upper flange portions, thereby providing a lower surface portion of the guidance surface. The toothed rack may be provided in the lower surface portion, wherein the teeth are either formed integrally with the third cross-sectional portion of the third track member, or the toothed rack is mounted to the lower surface portion, e.g. by bolts. The teeth of the toothed rack may be arranged in a central area of the lower surface portion along the longitudinal direction, so that the rollers of a guidance device may roll along opposite lateral sides of the toothed rack.

According to another embodiment, the first track member has a T-shaped cross section, such as formed by the first web portion connecting the first upper flange portion at its center to the first lower flange portion at its end. The second track member also may have a T-shaped cross section, such as formed by the second web portion connecting the second upper flange portion at its center to the second lower flange portion at its end. The first web portion may extend opposite the second web portion, wherein the first web portion can be mounted to the second web portion, e.g. via the third track member. The first upper flange portion may abut the second upper flange portion in a butt joint manner, to provide thereby an upper surface portion of the guidance surface. By such T-shaped cross sections of the first and second track members, a double T-shaped profile of the track structure is obtained which represents a very effective alternative to the double C-shaped profile of the track structure, as described above.

In particular, the third track member may be sandwiched between the first and second web portions, and connected to the first and second web portions via bolts. The third track member may have a square cross section, so that it rests not only against the first and second web portions but also against the first and second upper flange portions. In such a way a very effective combination of the third track member with the double T-profiled first and second track members is obtained.

According to another embodiment, the first track member has a H-shaped cross section. In particular, the first track member comprises a horizontal upper flange portion, a vertical first web portion, a vertical second web portion, a horizontal first lower flange portion and a horizontal second lower flange portion. The first web portion extends opposite the second web portion. The first web portion connects the upper flange portion to the first lower flange portion. The second web portion connects the upper flange portion to the second lower flange portion. The second track member may have a flat square cross section. Further, the second track member may rest against the upper flange portion of the first track member, such as above the upper flange portion. In such a way, a very simple possibility is provided how the H-profiled track structure, as known from the Prior Art, can be modified to include a second individual main load path, namely by a simple square shaped second track member resting upon the upper flange portion of the first track member.

In particular, the track structure may comprise a fourth track member having a square cross section and rests against the first lower flange portion, such as below the first lower flange portion. The track structure may comprise a fifth track member having a square cross section and resting against the second lower flange portion, such as below the second lower flange portion. In such a way, not only the upper flange portion is doubled by the second track member, but also the first lower flange portion is doubled by the fourth track member and the second lower flange portion is doubled by the fifth track member, so that all flange portions of the track structure are doubled, thereby in total forming four separate individual main load paths, or fifth individual main load paths in the case that a third track member is provided.

According to yet a further embodiment, the toothed rack is connected to or formed in the lower surface of the third track member. In such a way a simple and symmetric arrangement of the toothed rack is provided.

Alternatively, the toothed rack may be connected to or formed in the lower surface of the first lower flange portion and/or in the lower surface of the second lower flange portion and/or in the upper surface of the first upper flange portion and/or in the upper surface of the second upper flange portion. In particular, the toothed rack might be split, so that a first part is formed in the first lower or upper flange portion and a second part is formed in the second lower or upper flange portion next to the first part, so that first and second parts together form the toothed rack which can be commonly engaged by a drive pinion of the drive unit. In such a way, a simple and symmetric arrangement of the toothed rack is obtained, wherein a third track member is not necessarily required.

According to yet a further alternative embodiment, the toothed rack is connected to or formed in the side surface of the first upper flange portion and/or the side surface of the second upper flange portion, and/or in the side surface of the first lower flange portion and/or the side surface of the second lower flange portion. By such a design of the toothed rack being formed in the side surface of one of the flange portions, a very simple and easy to manufacture option of the toothed rack is provided, in particular since the toothed rack can be arranged in one of the track members and does not need to be arranged in both the first and second track members or in a third track member, as it is the case when the toothed rack is arranged in the symmetry plane.

According to yet another alternative embodiment, the toothed rack is connected to or formed in the side surface of the first web portion and/or in the side surface of the second web portion. The side surface of the first and second web portions provide enough space for an effective toothed rack and a considerably central for load transmission between a drive pinion and the toothed rack of the track structure is obtained.

In particular, the toothed rack may be formed as a separate part that is connected to the side surface of the first and/or second web portions via bolts. In such a way the toothed rack does not need to be machined in the surface of the track structure, but can be attached to the track structure.

Further particular, the bolts may fix the toothed rack to the side surface of the first and/or second web portions via duck feet connected to the toothed rack. Such duck feet are integrally formed with the toothed rack and include a bore to receive a bolt to fix the toothed rack to the track structure. No bores have to be included in the teeth of the toothed rack itself in such a way.

The duck feet may be provided in a serial manner on opposite sides along the longitudinal extension of the toothed rack. In such a way, a reliable fixation of the toothed rack to the track structure is obtained.

Alternatively, the duck feet may be provided on opposite ends of the toothed rack. In order to still provide a reliable shear force transfer between the toothed rack and the track structure, a plurality of shear pins may connect the toothed rack to the side surface of the first and/or second web portions along the longitudinal extension of the toothed rack between its opposite ends. The shear pins may be received in bores in the side surface of the first and/or second web portions. In the case that the bores in the side surface are formed as through bores proceeding through the entire first and second web portions to the opposite side surface, a counter plate may be provided on the opposite side surface in order to prevent the shear pins from falling out of the opposite side surface through the through bores. By such a design of the toothed rack, no duck feet need to be provided on opposite sides along the longitudinal extension of the toothed rack, so that the toothed rack can be formed with a greater width.

According to another alternative embodiment, the toothed rack is split along a longitudinal line into a first rack portion and a parallel second rack portion, both rack portions extending in the longitudinal direction of the toothed rack from one end to the opposite end of the toothed rack. Bolts may be provided in a serial manner between the first rack portion and the second rack portion long the longitudinal line to fix the toothed rack to the track structure. In such a way, no duck feet are required to fix the toothed rack to the track structure and the toothed rack can be formed with a greater width.

According to another alternative embodiment, the first upper flange portion and/or the first lower flange portion and/or the second upper flange portion and/or the second lower flange portion is formed with an extended thickness in order to provide a lateral mounting surface. The toothed rack may formed as a separate part that is connected to the lateral mounting surface via bolts. The bolts may be provided at opposite ends of the toothed rack and fixed via duck feet, wherein shear pins are provided along the longitudinal extension of the toothed rack to provide a shear connection between the toothed rack and the track structure along the longitudinal direction. By such a flange portion with extended thickness and a lateral mounting surface, a toothed rack formed as a separate part can be mounted also to the sides of the flange portions.

The invention may be embodied on an aircraft wing comprising a main wing and a slat. The slat is movably connected to the main wing via a slat track device according to an embodiment as described above. The features, properties and advantages as described above in connection with the slat track device also apply to the aircraft wing comprising such a slat track device.

SUMMARY OF THE DRAWINGS

Embodiments of the present invention are described in the following in more detail by means of a drawing. The drawing shows in FIG. 1 is a cross-sectional view of an aircraft wing according to the prior art, comprising a main wing and a slat connected to the main wing via a slat track device, FIG. 3 is a perspective view of a slat track device according to a first embodiment of the present invention, FIG. 4 is a different perspective view of the slat track device shown in FIG. 3, FIG. 5 is a perspective view of a slat track device according to a second embodiment of the present invention, FIG. 6 is a different perspective view of the slat track device shown in FIG. 5, FIG. 7 is a cross-sectional view of the slat track device shown in FIG. 5, FIG. 10 is a perspective view of a slat track device according to a fourth embodiment of the present invention, FIG. 11 is a different perspective view of the slat track device shown in FIG. 10, FIG. 12 is a perspective view of a slat track device according to a fifth embodiment of the present invention, FIG. 13 is a different perspective view of the slat track device shown in FIG. 12, FIG. 16 is a perspective view of a slat track device according to an eighth embodiment of the present invention, FIG. 17 is a perspective view of a slat track device according to a ninth embodiment of the present invention, FIG. 18 is a perspective view of a slat track device according to a tenth embodiment of the present invention, FIG. 21 is a perspective view of a slat track device according to a thirteenth embodiment of the present invention, FIG. 22 is a cross-sectional view of the slat track device shown in FIG. 21, FIG. 23 is a different perspective view of the slat track device shown in FIG. 21.

DETAILED DESCRIPTION OF THE INVENTION

Figure 1:
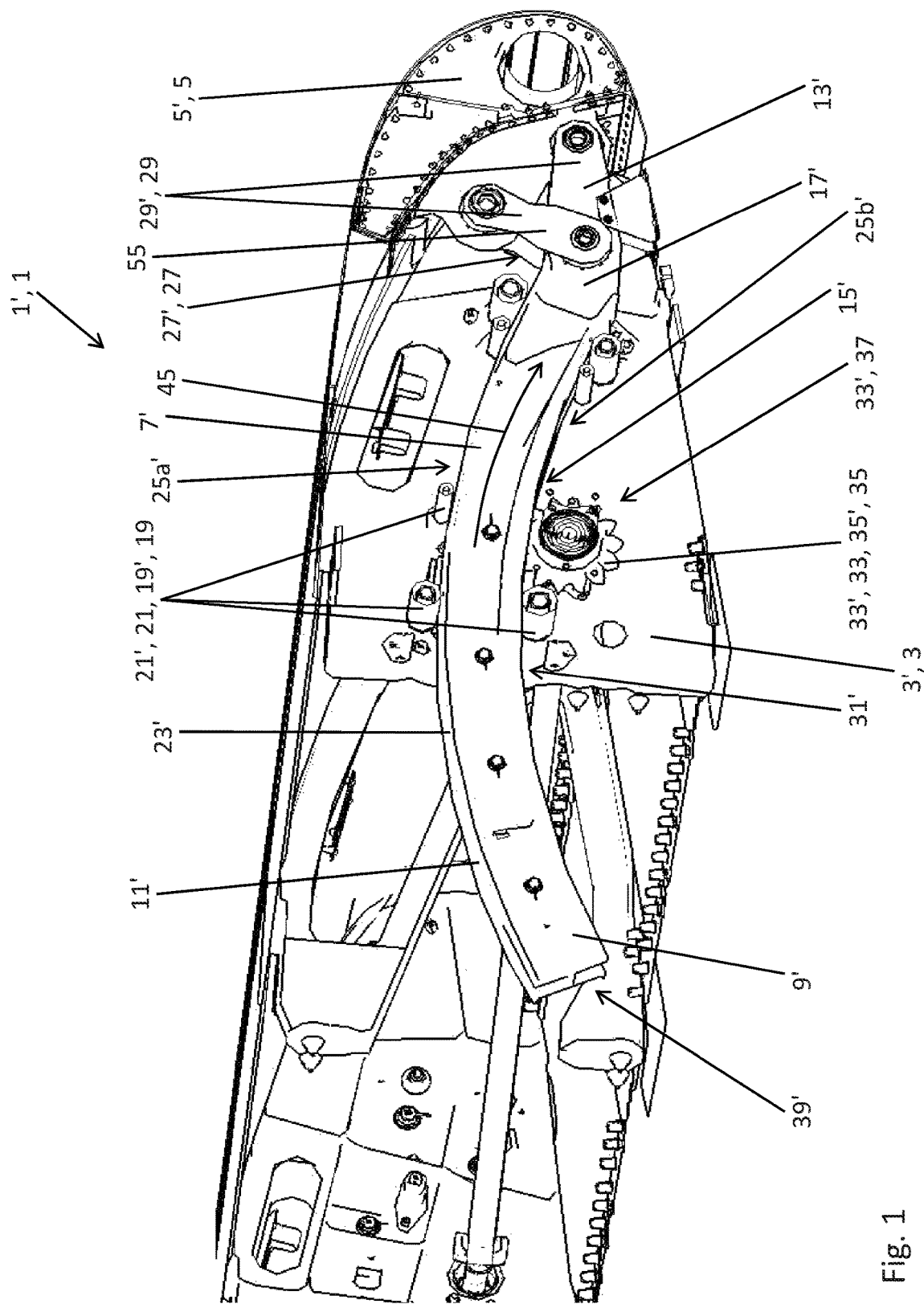
Figure 2:
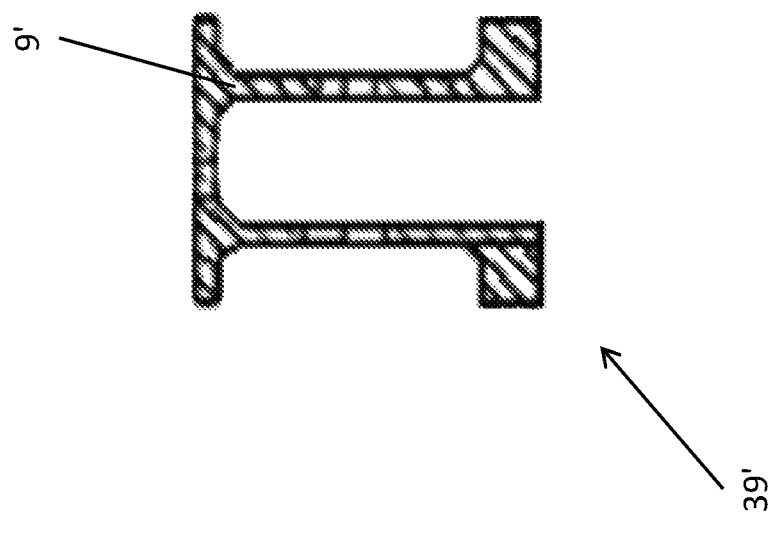
FIG. 2 is a cross-sectional view of the prior art slat track device as shown in FIG. 1.

In FIG. 1, an aircraft wing 1' according to the prior art is illustrated. The aircraft wing 1' comprises a main wing 3' and a slat 5', wherein the slat 5' is movably connected to the main wing 3' via a slat track device 7'. The slat track device 7' comprises a beam shaped main load bearing track structure 9', a guidance surface 11', a connection device 13' and an engagement device 15'. The track structure 9' is fixedly connected to the slat 5' with its first end 17', and movably connected to the main wing 3'. The guidance surface 11' is provided at the track structure 9' for being guided along a corresponding guidance device 19' in the form of rollers 21' provided at the main wing 3'. In particular, the guidance surface 11' comprises several surface portions 23' provided on opposite sides 25a', 25b' of the track structure 9', so that each surface portion 23' engages with corresponding rollers 21'. The connection device 13' is provided at the first end 17' of the track structure 9' for connecting the track structure 9' to the slat 5', in particular by a hinge connection 27' including master and slave links 29'. The engagement device 15' is provided at the track structure 9' which is formed as a toothed rack 31' for engagement with a drive member 33' in the form of a drive pinion 35' of a drive unit 37' provided at the main wing 3' for moving the slat track device 7' relative to the main wing 3'. As shown in FIG. 2, the track structure 9' of the slat track device 7' has a H-shaped cross section 39', so that the track structure 9' forms a single main load path.

In order to form at least two separate, individual main load paths, the slat track device 7 according to the present invention comprises a track structure 9 including at least two separate track members, namely a first track member 41 and a second track member 43, wherein each track member 41, 43 forms a separate individual main load path, as described in connection with the following embodiments. Apart from the design of the track structure 9 comprising two separate track members 41, 43, the aircraft wing 1 according to the present invention corresponds to the aircraft wing 1' according to the prior art as shown in FIG. 1.

In FIGS. 3 and 4, a first embodiment of the slat track device 7 for an aircraft wing 1 according to the present invention is shown. The slat track device 7 comprises a beam shaped main load bearing track structure 9, a guidance surface 11 arranged at the track structure 9, a connection device 13 arranged at the track structure 9 and an engagement device 15 arranged at the track structure 9. The track structure 9 is configured to be connected to a slat 5 and configured to be movably connected to a main wing 3. The guidance surface 11 is configured for being guided along a corresponding guidance device 19, such as a roller 21, provided at the main wing 3. The guidance surface 11 includes several surface portions 23 provided on opposite sides 25a, 25b of the track structure 9 in order to allow movement of the track structure 9 with respect to the main wing 3 only along a guidance path along the longitudinal direction 45 of the track structure 9. The connection device 13 is configured for connecting the track structure 9 to a slat 5. The connection device 13 is formed as a male lug 47, i.e. a flat projection 49 with a bore 51, configured for a hinge connection 27 with a corresponding part of the slat 5, i.e. a female lug 55 (see FIG. 1). The engagement device 15 is configured for engagement with a drive member 33 of a drive unit 37 provided at the main wing 3 for moving the slat track device 7 relative to the main wing 3. In the present embodiment, the engagement device 15 is formed as a toothed rack 31 configured to engage with a drive member 33 in the form of a drive pinion 35 provided at the main wing 3.

The track structure 9 comprises a first track member 41 and a second track member 43. The first track member 41 and the second track member 43 are formed separately from one another. Each of the first track member 41 and the second track member 43 is rigidly connected to, i.e. integrally formed with, both the connection device 13 and the engagement device 15, so that each of the first track member 41 and the second track member 43 forms an individual main load path. The first track member 41 is formed and arranged symmetrically to the second track member 43 and is connected to the second track member 43 along the longitudinal direction 45 of the track structure 9 via a plurality of bolts 57. The connection device 13 comprises a first device part 59, which is integrally formed with the first track member 41, and a second device part 61, which is integrally formed with the second track member 43, wherein first and second device parts 59, 61 are connected to one another to form the male lug 47.

The track structure 9 further comprises a third track member 63. The third track member 63 is formed separately from the first track member 41 and the second track member 43. The third track member 63 is connected to both, the connection device 13 and the engagement device 15, so that the third track member 63 forms an individual main load path. The first track member 41 and the second track member 43 are connected to one another via the third track member 63 along the longitudinal direction 45, thereby sandwiching the third track member 63 from opposite sides. The first, second and third track members 41, 43, 63 are connected all together along the longitudinal direction 45 via bolts 57. The connection device 13 comprises a third device part 65, which is formed integrally with the third track member 63 and which is sandwiched between the first device part 59 and the second device part 61. The third track member 63 comprises the engagement device 15, i.e. the toothed rack 31, so that the drive pinion 35 can engage the toothed rack 31 centrally between the first and second track members 41, 43 on the lower side 67 of the track structure 9. Opposite from the toothed rack 31 on the upper side 69 of the track structure 9, a smooth upper surface portion 71 of the guidance surface 11 is provided by the first, second and third track member 41, 43, 63 all together in order to engage with a roller 21 of the corresponding guidance device 19 of the main wing 3.

The track structure 9 has a profiled cross section 39 optimized for transfer of the necessary loads at a minimum weight. The first track member 41 comprises a first upper flange portion 73, a first web portion 75 and a first lower flange portion 77. The second track member 43 comprises a second upper flange portion 79, a second web portion 81 and a second lower flange portion 83. In particular, the track structure 9 has a double C-shaped cross section 39, wherein the first track member 41 has a C-shaped cross section 85 and the second track member 43 has a C-shaped cross section 87 symmetric with respect to the C-shaped cross section 85 of the first track member 41, so that the first web portion 75 extends opposite the second web portion 81. Between the first web portion 75 and the second web portion 81, the third track member 63 is sandwiched and mounted. The third track member 63 has a square cross section 89 and is aligned with the first and second upper flange portions 73, 79 in order to form the upper surface portion 71 of the guidance surface 11.

In FIGS. 5, 6 and 7, a second embodiment of the slat track device 7 is shown, which differs from the first embodiment mainly by the shape of the third track member 63. The third track member 63 has a T-shaped cross section 89, wherein a first cross-sectional portion 91 of the third track member 63 is sandwiched between the first web portion 75 and the second web portion 81, and wherein a second cross-sectional portion 93 of the third track member 63 rests against the first and second upper flange portions 73, 79, i.e. lies above the first and second upper flange portions 73, 79, thereby providing the upper surface portion 71 of the guidance surface 11.

Figure 9:
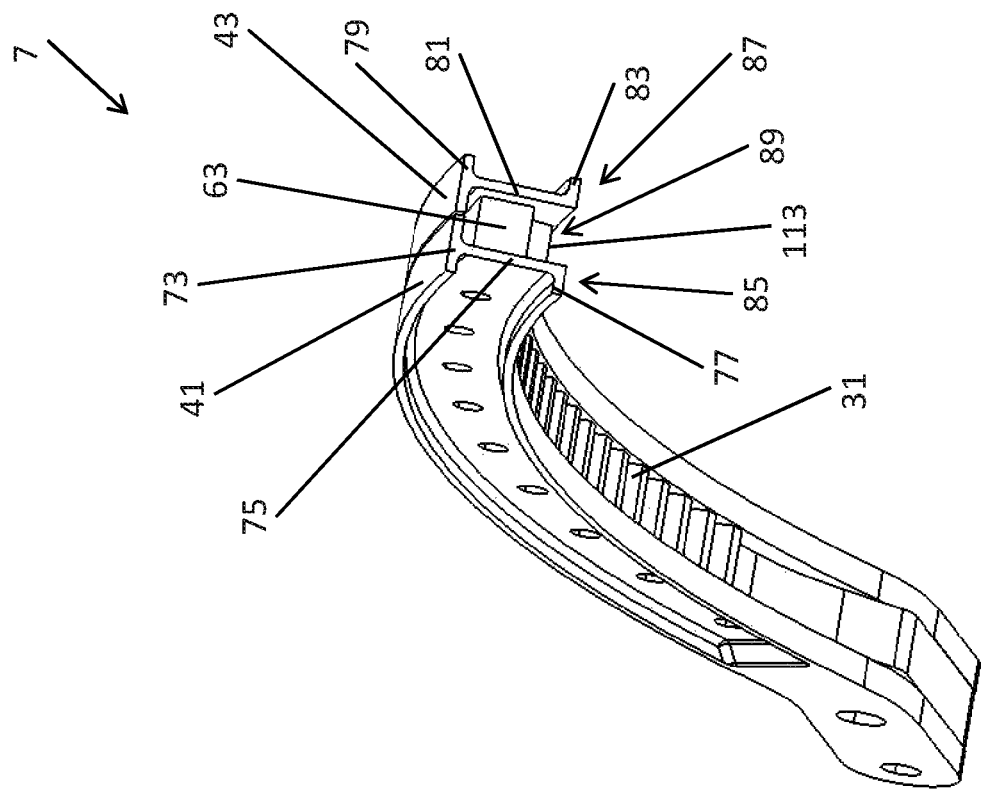
FIG. 9 is a different perspective view of the slat track device shown in FIG. 8.
Figure 8:
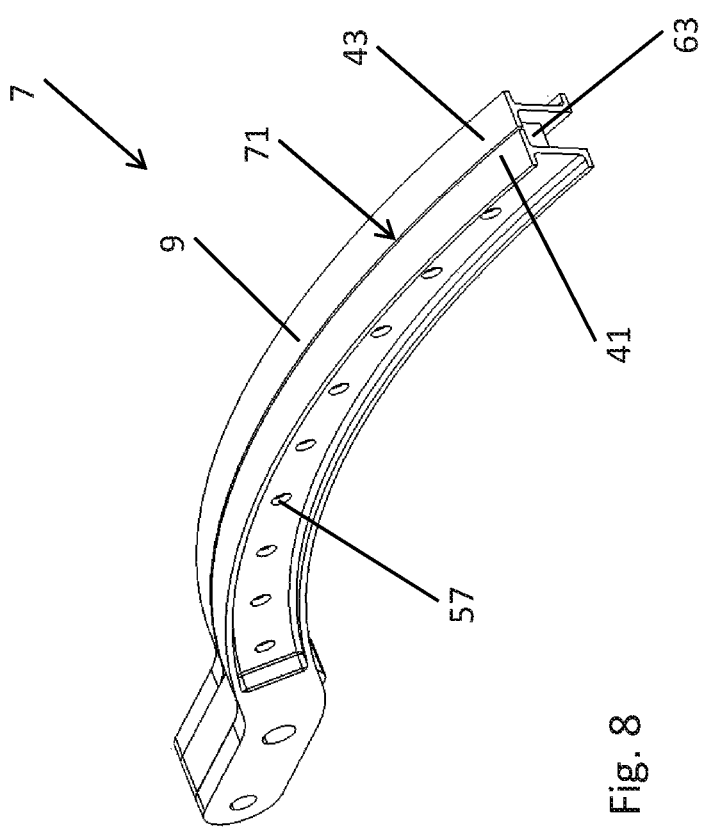
FIG. 8 is a perspective view of a slat track device according to a third embodiment of the present invention.

In FIGS. 8 and 9, a third embodiment of the slat track device 7 is shown, which differs from the first embodiment mainly by the track structure 9 having a double T-shaped cross section 39, wherein the first track member 41 has a T-shaped cross section 85 and the second track member 43 has a T-shaped cross section 87. The first web portion 75 extends opposite the second web portion 81, and the first upper flange portion 73 abuts the second upper flange portion 79 in a butt-joint manner, in order to together provide an upper surface portion 71 of the guidance surface 11. The third track member 63 has a square cross section 89 and is sandwiched between the first web portion 75 and the second web portion 81. The third track member 63 also rests against the first and second upper flange portions 73, 79.

In FIGS. 10 and 11, a fourth embodiment of the slat track device 7 is shown, which differs from the first embodiment mainly by the track structure 9 having a H-shaped cross section 39. In particular, the first track member 41 has a H-shaped cross section 85, wherein the first track member 41 comprises a horizontal upper flange portion 95, a vertical first web portion 97, a vertical second web portion 99, a horizontal first lower flange portion 101 and a horizontal second lower flange portion 103. The first web portion 97 extends opposite the second web portion 99, the first web portion 97 connects the upper flange portion 95 to the first lower flange portion 101, and the second web portion 99 connects the upper flange portion 95 to the second lower flange portion 103. Further, the second track member 43 has a flat square cross section 87 and rests against the upper flange portion 95 from above the upper flange portion 95.

In FIGS. 12 and 13, a fifth embodiment of the slat track device 7 is shown, which differs from the fourth embodiment mainly by the track structure 9 comprising a fourth track member 105 and a fifth track member 107, both having a square cross section 109, 111, wherein the fourth track member 105 rests against the first lower flange portion 101 from below the first lower flange portion 101, and the fifth track member 107 resting against the second lower flange portion 103 from below the second lower flange portion 103.

In the afore-described first to fifth embodiment, the toothed rack 31 is provided in the lower surface 113 of the third track member 63. In the following embodiments, other option for arranging the toothed rack 31 at the track structure 9 are illustrated and described.

Figure 14:
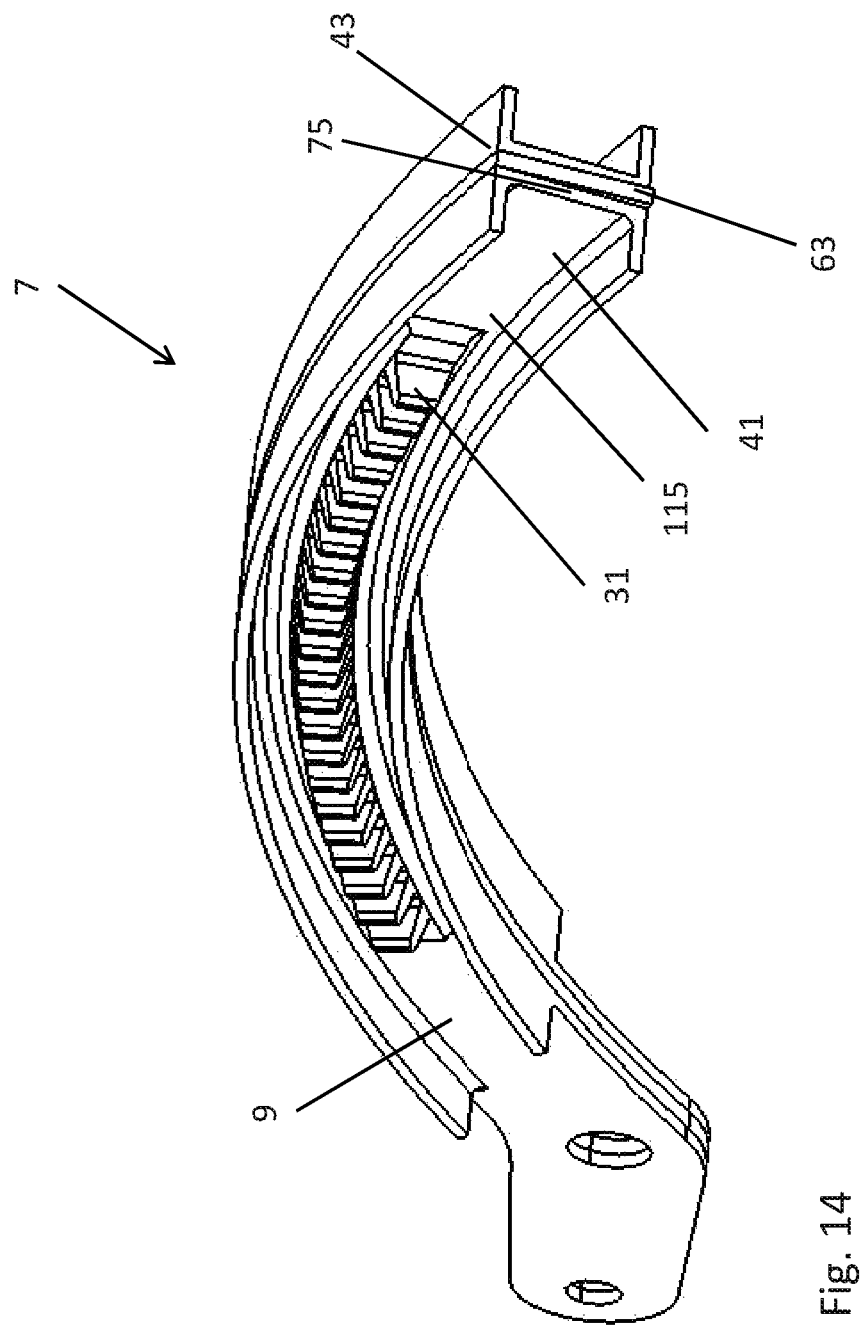
FIG. 14 is a perspective view of a slat track device according to a sixth embodiment of the present invention.

In FIG. 14, a sixth embodiment of the slat track device 7 is shown, which differs from the first embodiment by the toothed rack 31 being formed in the side surface 115 of the first web portion 75.

Figure 15:
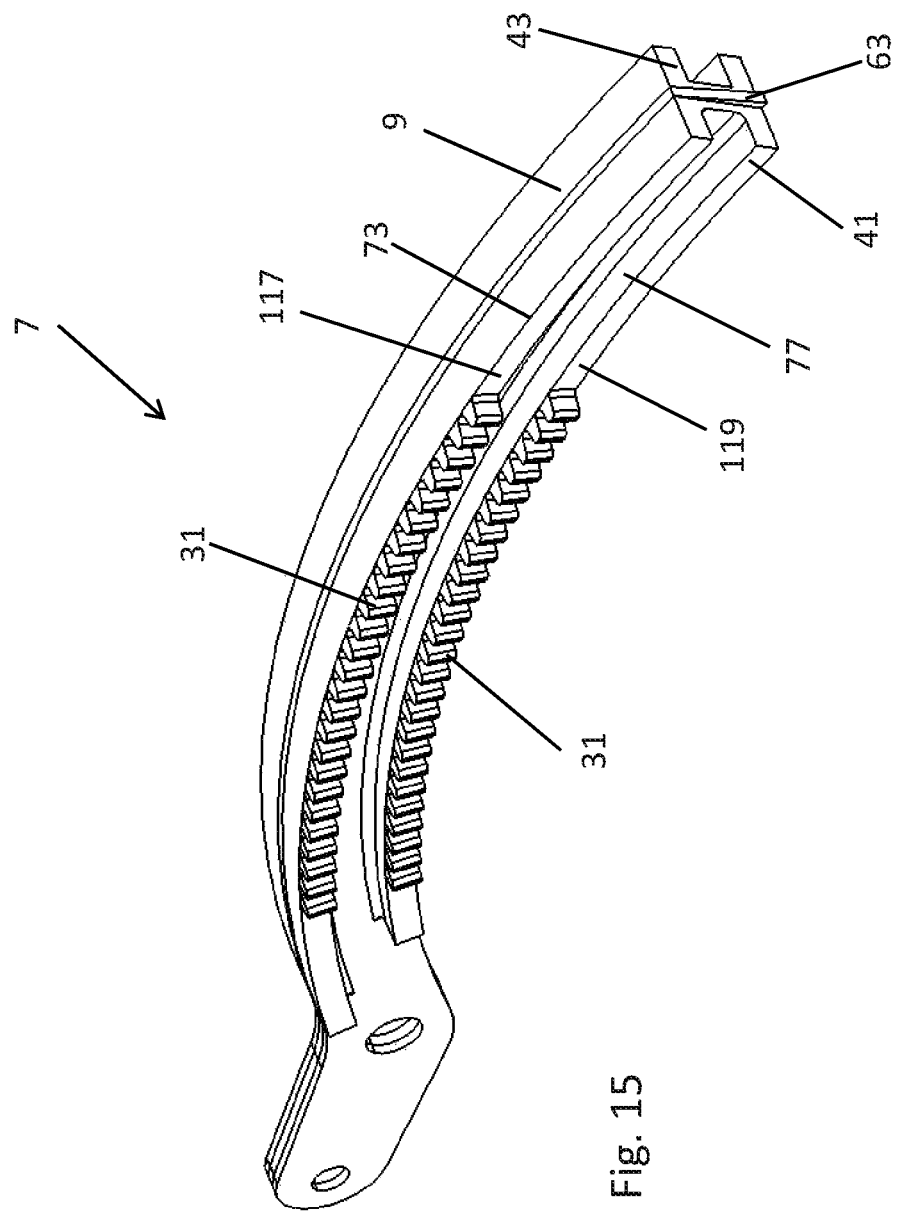
FIG. 15 is a perspective view of a slat track device according to a seventh embodiment of the present invention.

In FIG. 15, a seventh embodiment of the slat track device 7 is shown which differs from the sixth embodiment by the toothed rack 31 being formed in the side surface 117 of the first upper flange portion 73 and in the side surface 119 of the first lower flange portion 77.

In FIG. 16, an eighth embodiment of the slat track device 7 is shown which differs from the seventh embodiment by the toothed rack 31 being formed in the lower surface 121 of the first lower flange portion 77 and in the lower surface 123 of the second lower flange portion 83, wherein the toothed rack 31 is split up, so that a first part 125 of the toothed rack 31 is formed in the first lower flange portion 77 and a second part 127 of the toothed rack 31 is formed in the second lower flange portion 83 next to the first part 125, so that the first and second parts 125, 127 together form the toothed rack 31. Also, the teeth 129 of the toothed rack 31 are formed under the surface of the first and second lower flange portions 77, 83, so that the teeth 129 do not project out of the lower surface 121, 123 of the first and second lower flange portions 77, 83 and do not form an obstacle to a roller 21 rolling over said lower surface 121, 123.

In FIG. 17, a ninth embodiment of the slat track device 7 is shown which differs from the eighth embodiment by the teeth 129 of the toothed rack projecting out of the lower surface 121, 123 of the first and second lower flange portions 77, 83. In this case, the rollers 21 of a guidance device 19 can roll on opposite lateral sides 131 of the toothed rack 31, since the toothed rack 31 is formed only in a central part 133 of said lower surface 121, 123 of the first and second lower flange portions 77, 83.

In FIG. 18, a tenth embodiment of the slat track device 7 is shown which differs from the ninth embodiment by the toothed rack 31 being split up with a distance in between, so that between the first part 125 of the toothed rack 31 formed on the lower surface 121 of the first lower flange portion 77 and the second part 127 of the toothed rack 31 formed on the lower surface 123 of the second lower flange portion 83, a space 135 is provided where no teeth 129 are formed in said lower surface 121, 123 of the first and second lower flange portions 77, 83, so that a roller 21 of the guidance device 19 can roll along said space 135 between the two parts 125, 127 of the toothed rack 31.

Figure 19:
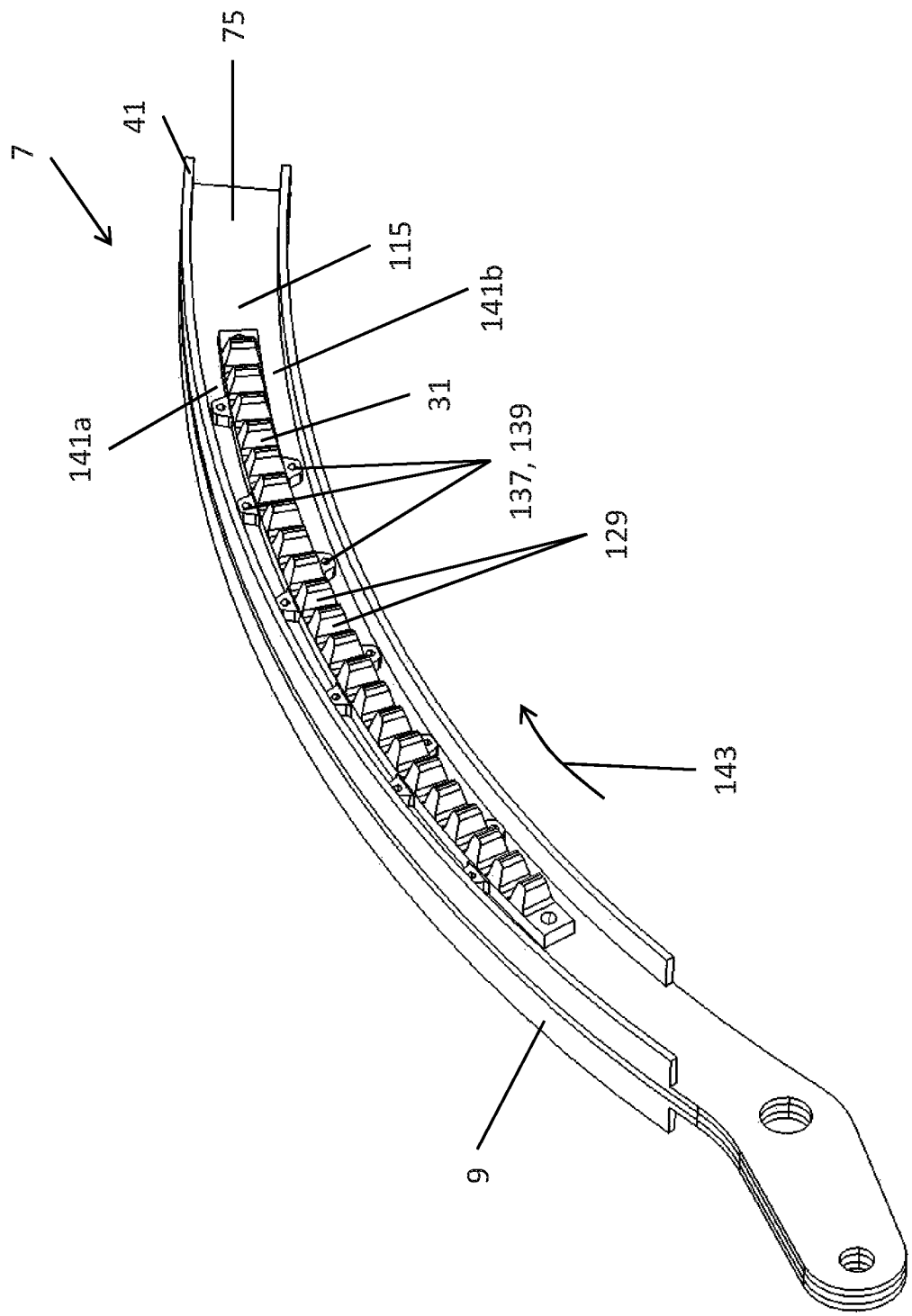
FIG. 19 is a perspective view of a slat track device according to an eleventh embodiment of the present invention.

In FIG. 19, an eleventh embodiment of the slat track device 7 is shown which differs from the sixth embodiment by the toothed rack 31 being formed as a separate part that is connected to the side surface 115 of the first web portion 75 via bolts 137. The bolts 137 fix the toothed rack 31 to the side surface 115 of the first web portion 75 via duck feet 139 connected to the toothed rack 31. The duck feet 139 are provided in a serial manner on opposite sides 141a, 141b along the longitudinal direction 143 of the toothed rack 31.

Figure 20:
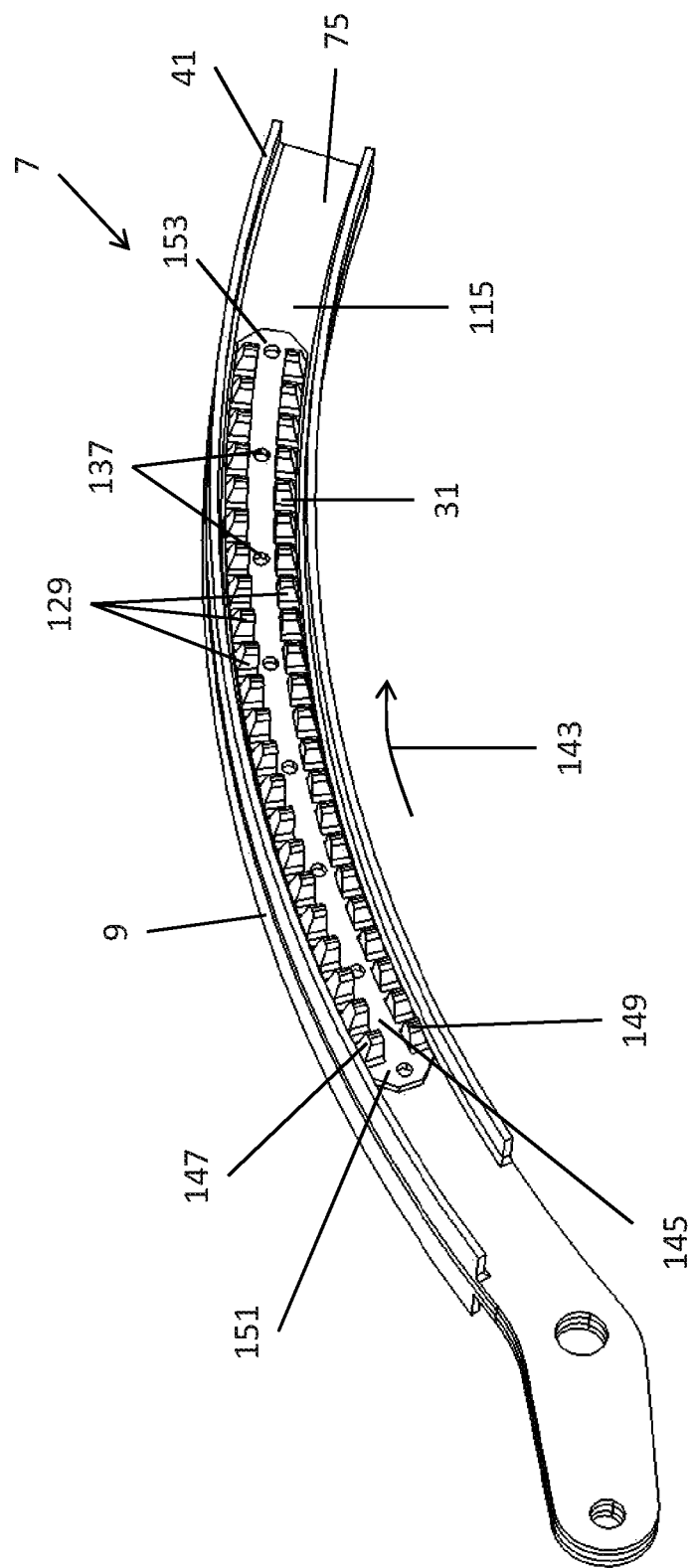
FIG. 20 is a perspective view of a slat track device according to a twelfth embodiment of the present invention.

In FIG. 20, a twelfth embodiment of the slat track device 7 is shown which differs from the eleventh embodiment by the toothed rack 31 being split up along a longitudinal line 145 into a first rack portion 147 and a parallel second rack portion 149, wherein both rack portions 147, 149 extend in the longitudinal direction 143 of the toothed rack 31 from one end 151 to the opposite end 153. The bolts 137, instead of holding the toothed rack 31 via duck feet 139, are provided in a serial manner between the first and second rack portion 147, 149 along the longitudinal line 145.

In FIGS. 21, 22 and 23, a thirteenth embodiment of the slat track device 7 is shown which differs from the eleventh embodiment by the duck feet 139 being provided on opposite ends 151, 153 of the toothed rack, only. Additionally, a plurality of shear pins 155 are provided connecting the toothed rack 31 to the side surface 115 of the first web portion 75 along the longitudinal direction 143 of the toothed rack 31 between the opposite ends 151, 153 in a serial manner. The shear pins 155 are received in bores 157 in the first and second web portions 75, 81, and are held by a counter plate 159 mounted to the side surface 161 of the second web portion 81, so that they cannot slip out of the bores 157 to the side surface 161 of the second web portion 81.

Figure 24:
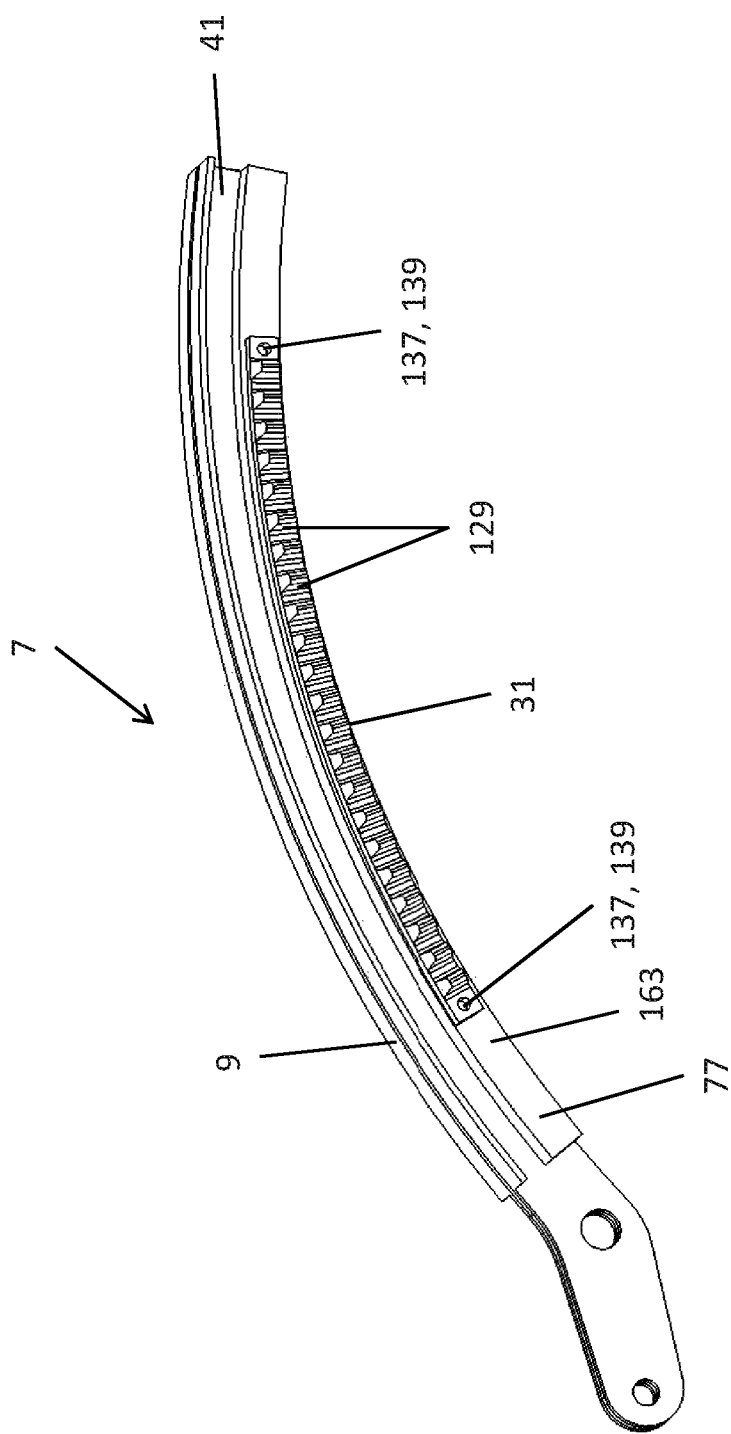
FIG. 24 is a perspective view of a slat track device according to a fourteenth embodiment of the present invention.

In FIG. 24, a fourteenth embodiment of the slat track device 7 is shown which differs from the seventh embodiment by the first lower flange portion 77 being formed with an extended thickness in order to provide a lateral mounting surface 163 and by the toothed rack 31 being formed as a separate part that is connected to the lateral mounting surface 163 via bolts 137. In addition to the bolts 137, also shear pins 155 can be employed to hold the toothed rack 31 in those areas where no bolts 137 are provided, as described in connection with the thirteenth embodiment.

Figure 25:
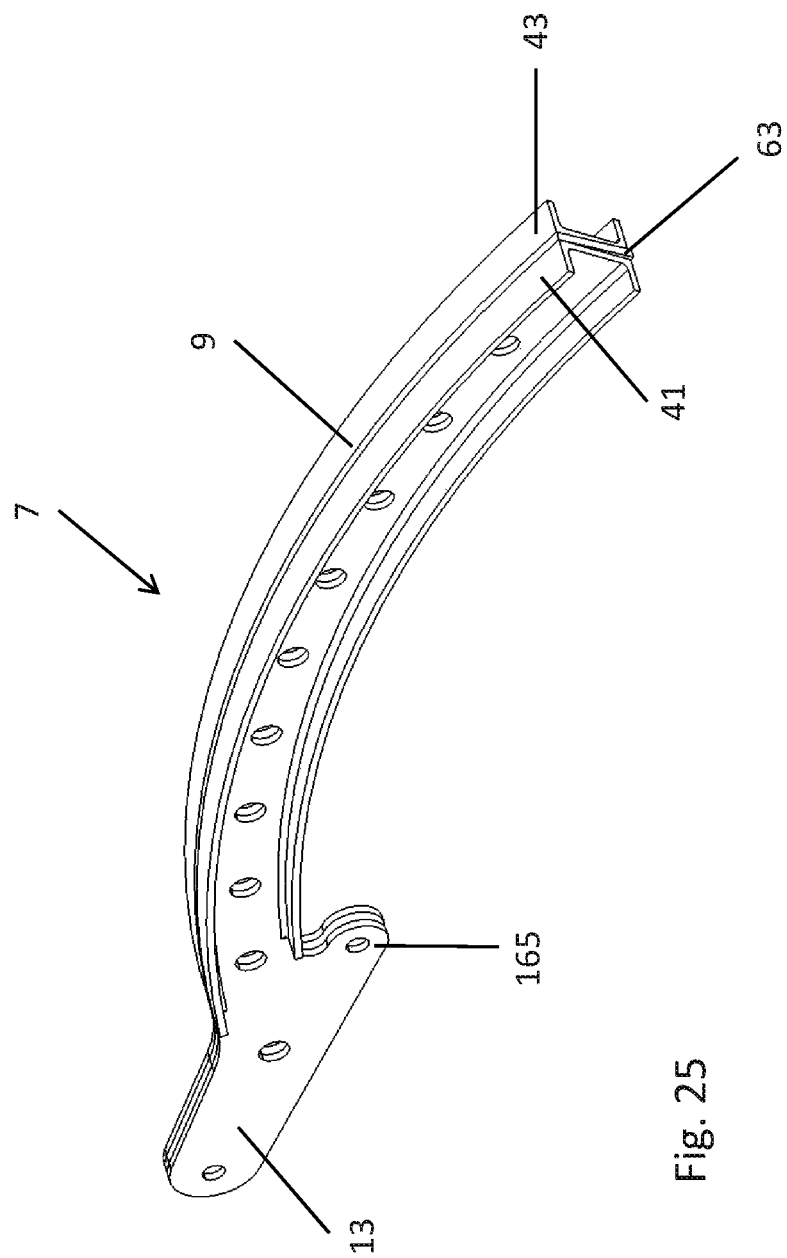
FIG. 25 is a perspective view of a slat track device according to a fifteenth embodiment of the present invention.

In FIG. 25, a fifteenth embodiment of the slat track device 7 is shown which differs from the sixth embodiment by the engagement device 15, instead of being formed as a toothed rack 31, is formed as a hinged mounting 165, namely a male lug, for a hinge connection to a drive member 33 in the form of a drive rod 167 of a drive unit 37 provided at the main wing 3.

Figure 26:
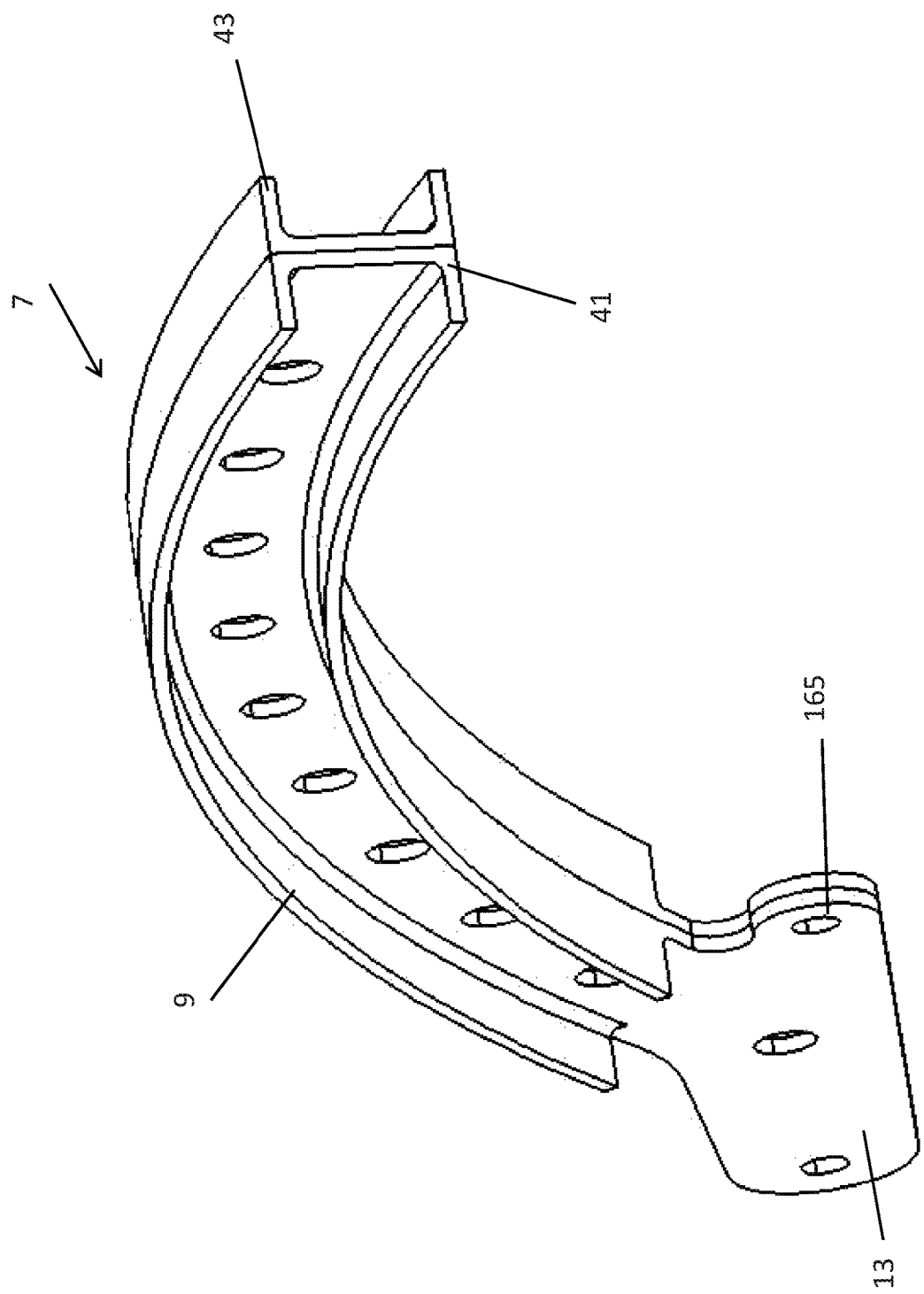
FIG. 26 is a perspective view of a slat track device according to a sixteenth embodiment of the present invention.

In FIG. 26, a sixteenth embodiment of the slat track device 7 is shown which differs from the fifteenth embodiment by no third track member 63 being provided that is sandwiched between the first and second track members 41, 43. Instead, only a first track member 41 and a second track member 43 are provided, so that the first web portion 75 rests directly against the second web portion 81.

Figure 29:
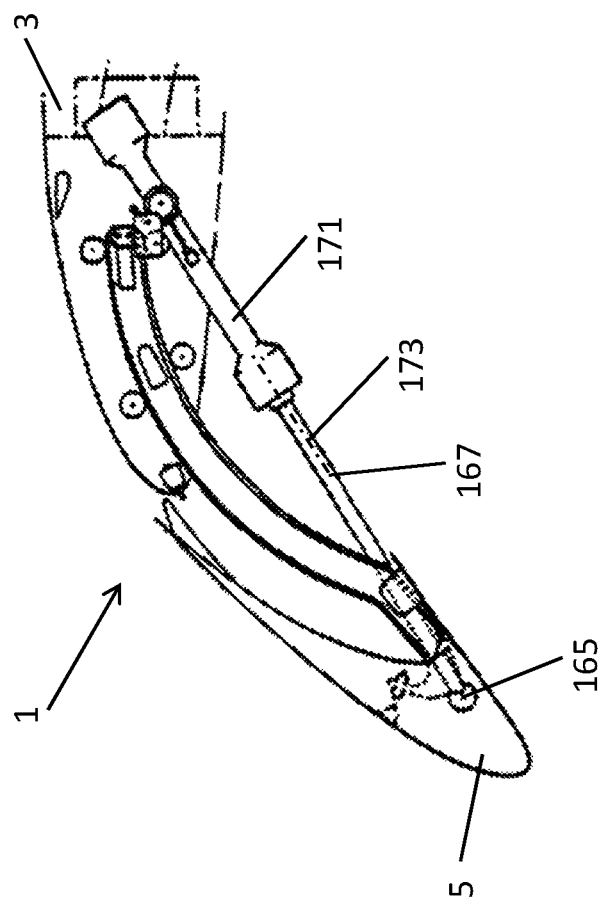
FIG. 29 is a cross-sectional view of an aircraft wing employing a third embodiment of a drive unit for driving the slat track device shown in FIGS. 25 and 26.
Figure 27:
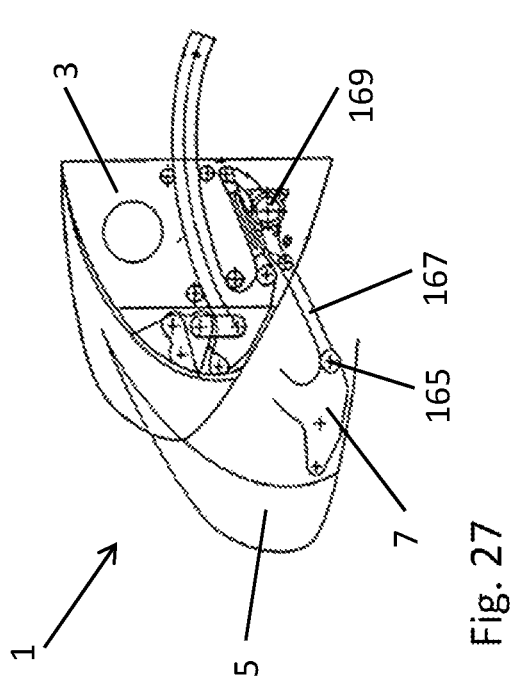
FIG. 27 is a cross-sectional view of an aircraft wing employing a first embodiment of a drive unit for driving the slat track device as shown in FIGS. 25 and 26.
Figure 28:
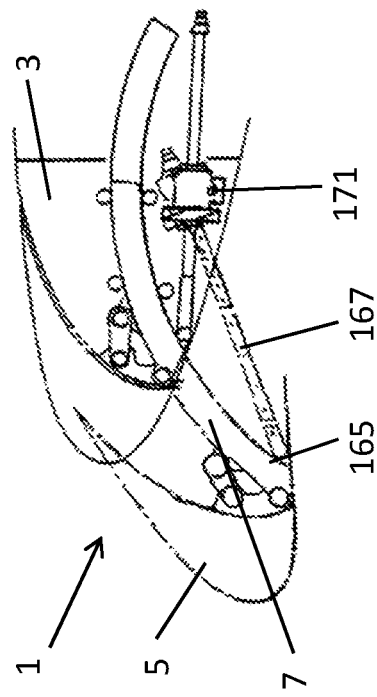
FIG. 28 is a cross-sectional view of an aircraft wing employing a second embodiment of a drive unit for driving the slat track device shown in FIGS. 25 and 26.

In FIGS. 27, 28 and 29, three options are shown, how a slat track device 7 according to the fifteenth and sixteenth embodiment can be driven. In FIG. 27, the drive unit 37 provided at the main wing 3 comprises a rotary drive 169 which is connected to a drive rod 167 via a hinge 171, wherein the drive rod 167 is connected to the hinge mounting 165 of the slat track device 7. Alternatively, as shown in FIGS. 28 and 29, the drive rod 167 can be connected to a linear motor 171, which drives the drive rod 167 along its longitudinal axes 173 by a spindle (FIG. 28) or by an electromagnetic or hydraulic cylinder (FIG. 29).

Figures 30, 31:
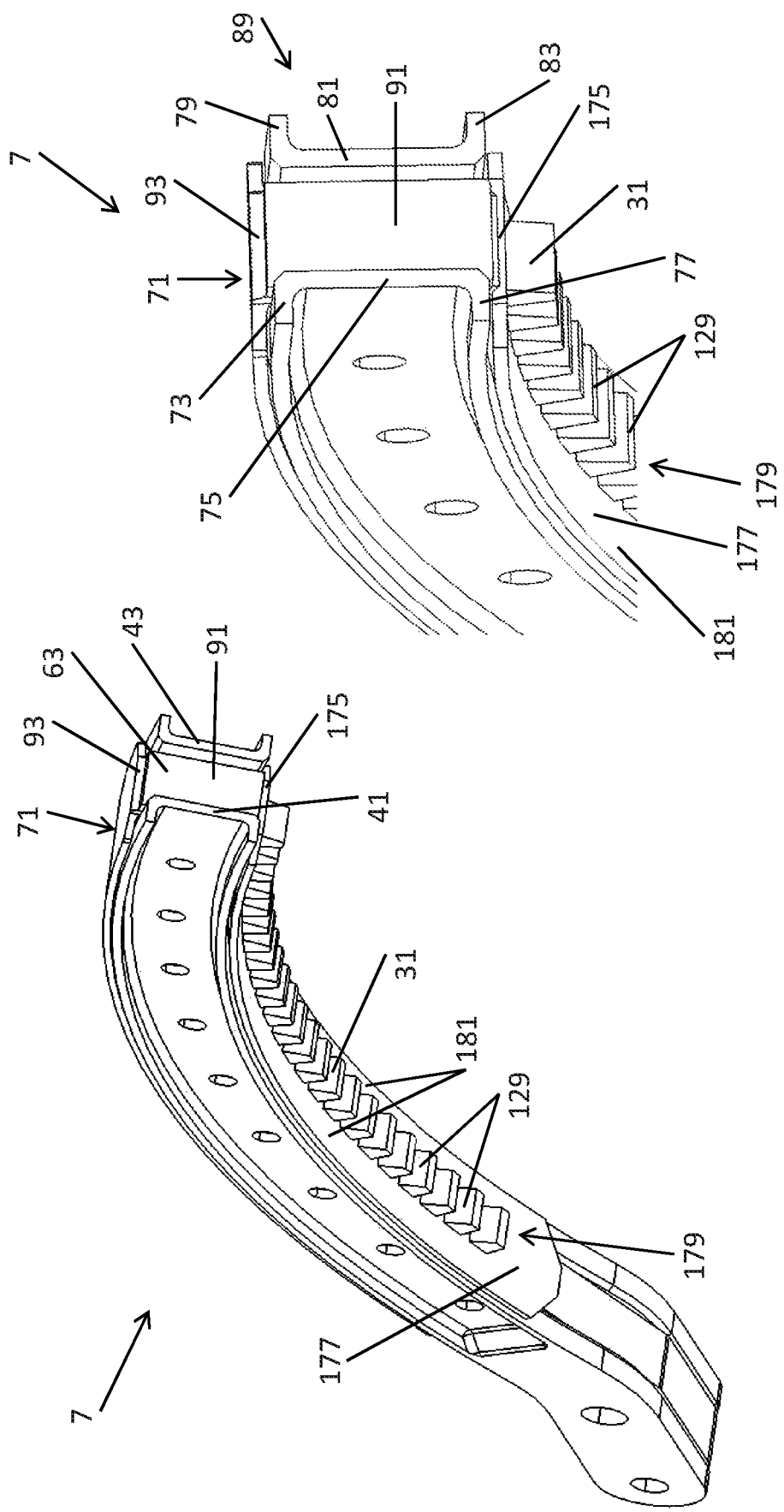
FIG. 30 is a perspective view of a slat track device according to a seventeenth embodiment of the present invention and FIG. 31 is a cross-sectional view of the slat track device shown in FIG. 30.

In FIGS. 30 and 31, a seventeenth embodiment of the slat track device 7 is shown which differs from the second embodiment mainly by the shape of the third track member 63. The third track member 63, instead of having a T-shaped cross section 89, has an I-shaped cross section 89 or an H-shaped cross section 89, comprising a first cross-sectional portion 91, a second cross-sectional portion 93 and a third cross-sectional portion 175. The first cross-sectional portion 91 of the third track member 63 is sandwiched between the first web portion 75 and the second web portion 81. The second cross-sectional portion 93 of the third track member 63 rests against the first and second upper flange portions 73, 79, i.e. lies above the first and second upper flange portions 73, 79, thereby providing the upper surface portion 71 of the guidance surface 11. The third cross-sectional portion 175 of the third track member 63 rests against the first and second lower flange portions 77, 83, i.e. lies below the first and second lower flange portions 77, 83, thereby providing a lower surface portion 177 of the guidance surface 11. In the lower surface portion 177 the toothed rack 31 is provided, wherein the teeth 129 are formed integrally with the third cross-sectional portion 175 of the third track member 63. Also the teeth 129 of the toothed rack 31 are arranged only in a central area 179 of the lower surface portion 177, so that the rollers 21 of a guidance device 19 may roll along the lower surface portion on opposite lateral sides 181 of the toothed rack 31, where no teeth 129 are provided.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A slat track device for an aircraft wing comprising
a beam-shaped main load bearing track structure, wherein the beam-shaped main load bearing track structure is configured to be connected to a slat and configured to move with respect to a main wing,
a guidance surface at the beam-shaped main load bearing track structure and configured to be guided along a corresponding guidance device mounted the main wing,
a connection device connected to the beam-shaped main load bearing track structure and configured to connect the beam-shaped main load bearing track structure to the slat, and
an engagement device which is connected to the beam-shaped main load bearing track structure and configured to engage a drive member of a drive unit mounted to the main wing,
wherein the beam-shaped main load bearing track structure comprises a first track member and a second track member, wherein the first track member and the second track member are connected, and wherein each of the first track member and the second track member is connected to both the connection device and the engagement device.

2. The slat track device according to claim 1, wherein the first track member is connected to the second track member along a longitudinal direction of the beam-shaped main load bearing track structure.

3. The slat track device according to claim 1, wherein the engagement device includes a toothed rack configured to engage with a drive pinion of the drive unit mounted to the main wing.

4. The slat track device according to claim 1, wherein the engagement device includes a hinge forming a hinged connection to a drive rod of the drive unit mounted to the main wing.

5. The slat track device according to claim 1, wherein the connection device includes a lug included in a hinged connection with a corresponding part of the slat.

6. The slat track device according to claim 1, wherein the beam-shaped main load bearing track structure comprises a third track member,
wherein the third track member is connected to both the connection device and the engagement device,
wherein the first track member or the second track member is connected to the third track member along a longitudinal direction of the first track member or the second track member, and
wherein the first track member and the second track member are connected to one another via the third track member.

7. The slat track device according to claim 1, wherein the first track member comprises a first upper flange portion, a first web portion and a first lower flange portion, and
wherein the second track member comprises a second upper flange portion, a second web portion and a second lower flange portion.

8. The slat track device according to claim 6, wherein the first track member comprises a first upper flange portion, a first web portion and a first lower flange portion, wherein the second track member comprises a second upper flange portion, a second web portion and a second lower flange portion, wherein the first track member has a C-shaped cross section, wherein the second track member has a C-shaped cross section, wherein the first web portion extends opposite the second web portion, and wherein the third track member is sandwiched between the first web portion and the second web portion, wherein either the third track member has a square cross section and is aligned with the first and second upper flange portions, or the third track member has a T-shaped cross section, wherein a first cross sectional portion of the third track member is sandwiched between the first and second web portions and wherein a second cross sectional portion of the third track member rests against the first and second upper flange portions, or the third track member has an I-shaped cross section or a H-shaped cross section, comprising a first cross sectional portion, a second cross sectional portion and a third cross sectional portion, wherein the first cross-sectional portion is sandwiched between the first web portion and the second web portion, wherein the second cross-sectional portion rests against the first and second upper flange portions, wherein the third cross sectional portion rests against the first and second lower flange portions wherein the toothed rack is in a lower surface portion of the third cross sectional portion, in a central area of the lower surface portion.

9. The slat track device according to claim 6, wherein the first track member comprises a first upper flange portion, a first web portion and a first lower flange portion, wherein the second track member comprises a second upper flange portion, a second web portion and a second lower flange portion, wherein the first track member has a T-shaped cross section, wherein the second track member has a T-shaped cross section, wherein the first web portion extends opposite the second web portion, wherein the first upper flange portion abuts the second upper flange portion in a butt joint manner, and wherein the third track member is sandwiched between the first web portion and the second web portion.

10. The slat track device according to claim 6, wherein the first track member has a Π-shaped cross section, wherein the first track member comprises an upper flange portion, a first web portion, a second web portion, a first lower flange portion and a second lower flange portion, wherein the first web portion extends opposite the second web portion, wherein the first web portion connects the upper flange portion to the first lower flange portion, wherein the second web portion connects the upper flange portion to the second lower flange portion, wherein the second track member has a flat square cross section, wherein the second track member rests against the upper flange portion, wherein the beam-shaped main load bearing track structure comprises a fourth track member resting against the first lower flange portion, and wherein the beam-shaped main load bearing track structure comprises a fifth track member resting against the second lower flange portion.

11. The slat track device according to claim 6, wherein the toothed rack is connected to or integral with a surface of the third track member, or wherein the toothed rack is connected to or integral with a lower surface of the first lower flange portion or a lower surface of the second lower flange portion, or wherein the toothed rack is connected to or integral with a side surface of the first upper flange portion or a side surface of the second upper flange portion, or in the side surface of the first lower flange portion or the side surface of the second lower flange portion, or wherein the toothed rack is connected to or integral with a side surface of the first web portion or in the a surface of the second web portion.

12. The slat track device according to claim 11, wherein the toothed rack is connected to the side surface of the first or the side surface of the second web portions by bolts.

13. The slat track device according to claim 12, wherein the toothed rack is split along a longitudinal line into a first rack portion and a parallel second rack portion, and wherein the bolts are arranged in a serial manner between the first and second rack portions, or wherein the bolts fix the toothed rack to the side surface of the first or second web portions via duck feet connected to the toothed rack, wherein either:

the duck feet are arranged in a serial manner on opposite sides along the longitudinal direction of the toothed rack, or the duck feet are arranged on opposite ends of the toothed rack, wherein a plurality of shear pins connect the toothed rack to the side surface of the first or second web portions along the longitudinal direction of the toothed rack between the opposite ends.

14. The slat track device according to claim 11, wherein the first upper flange portion or the first lower flange portion or the second upper flange portion or the second lower flange portion is formed with an extended thickness forming a lateral mounting surface, and wherein the toothed rack is fastened to the lateral mounting surface.

15. An aircraft wing comprising a main wing and a slat, wherein the slat is movably connected to the main wing via the slat track device according to claim 1.

* * * * *